United States Patent
Cho et al.

(10) Patent No.: US 11,323,557 B2
(45) Date of Patent: May 3, 2022

(54) ELECTRONIC DEVICE FOR PROVIDING ACTIVITY INFORMATION OF USER AND ACTIVITY INFORMATION OF OTHER USERS RECEIVED FROM EXTERNAL ELECTRONIC DEVICES, AND OPERATING METHOD THEREFOR

(71) Applicant: Samsung Electronics Co., Ltd., Gyeonggi-do (KR)

(72) Inventors: Seong-Ho Cho, Seoul (KR); Byung-Hoon Seo, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 290 days.

(21) Appl. No.: 16/614,206

(22) PCT Filed: May 18, 2018

(86) PCT No.: PCT/KR2018/005721
§ 371 (c)(1),
(2) Date: Nov. 15, 2019

(87) PCT Pub. No.: WO2018/212621
PCT Pub. Date: Nov. 22, 2018

(65) Prior Publication Data
US 2021/0344788 A1   Nov. 4, 2021

(30) Foreign Application Priority Data

May 18, 2017   (KR) .......................... 10-2017-0061510

(51) Int. Cl.
*H04M 1/72427*   (2021.01)
*H04L 67/50*   (2022.01)
(Continued)

(52) U.S. Cl.
CPC ... *H04M 1/72427* (2021.01); *H04M 1/72457* (2021.01); *H04M 1/72469* (2021.01); *H04W 4/029* (2018.02); *H04M 2250/12* (2013.01)

(58) Field of Classification Search
CPC ......... H04M 1/72427; H04M 1/72457; H04M 1/72469; H04M 2250/12; H04W 4/029
See application file for complete search history.

(56) References Cited

U.S. PATENT DOCUMENTS

2013/0054720 A1* 2/2013 Kang ..................... G06Q 10/10
709/206
2016/0072690 A1* 3/2016 Molettiere ............ G06F 3/0488
709/224
(Continued)

FOREIGN PATENT DOCUMENTS

KR   1020130083882   7/2013
KR   1020140116987   10/2014
(Continued)

OTHER PUBLICATIONS

KR Notice of Patent Grant dated Jan. 14, 2021 issued in counterpart application No. 10-2017-0061510, 6 pages.
PCT/ISA/210 Search Report issued on PCT/KR2018/005721, pp. 4.
PCT/ISA/237 Written Opinion issued on PCT/KR2018/005721, pp. 5.

*Primary Examiner* — Farid Seyedvosoghi
(74) *Attorney, Agent, or Firm* — The Farrell Law Firm, P.C.

(57) ABSTRACT

An electronic device is provided that includes at least one communication module; a display; and a processor. The processor may receive, from a server through the at least one communication module, first data relating to an activity result previously performed by one or more users in connection with a specified type of activity; receive, from one or more external electronic devices corresponding to the one or more users, through the at least one communication module, second data which is obtained by the one or more (Continued)

external electronic devices and relates to the state of an activity being performed in connection with the specified type of activity; and display, on the display, the first data, the second data, third data relating to the activity result of a user of the electronic device, and fourth data relating to the activity state of the user.

18 Claims, 17 Drawing Sheets

(51) Int. Cl.
*H04W 4/029* (2018.01)
*H04M 1/72469* (2021.01)
*H04M 1/72457* (2021.01)

(56) References Cited

U.S. PATENT DOCUMENTS

2016/0315885 A1* 10/2016 Sanghavi .............. H04L 51/046
2016/0366556 A1* 12/2016 Chowdhury ............ H04W 4/02
2017/0085691 A1   3/2017 Kim et al.

FOREIGN PATENT DOCUMENTS

| KR | 1020140146296 | 12/2014 |
| KR |    101702001  |  2/2017 |
| KR | 1020170035657 |  3/2017 |

\* cited by examiner

```
{
  "message": "USERNAME:USERID:REQUEST_TYPE",
  "to_list": [
    {
      "to_index": " REQUEST_INDEX",
      "to_ID ": " USERID_1"
    }
      {
      "to_index": " REQUEST_INDEX ",
      "to_ID ": " USERID_2"
    }
    ...
    {
      "to_index": " REQUEST_INDEX ",
      "to_ID ": " USERID_N"
    }
  ]
}
```

FIG.7

```
{
  "message": " USERNAME_1:USERID_1:RESPONSE_TYPE ",
  "to_list": [
    {
    "to_index": " RESPONSE_INDEX",
    "to_status": " STATUS ",
    "to_ID ": " USERID"
    }
  ]
}
```

FIG.8

ELECTRONIC DEVICE FOR PROVIDING ACTIVITY INFORMATION OF USER AND ACTIVITY INFORMATION OF OTHER USERS RECEIVED FROM EXTERNAL ELECTRONIC DEVICES, AND OPERATING METHOD THEREFOR

CROSS-REFERENCE TO RELATED APPLICATION(S)

This application is a National Phase Entry of PCT international Application No. PCT/KR2018/005721, which was filed on May 18, 2018, and claims priority to Korean Patent Application No. 10-2017-0061510 filed on May 18, 2017, the contents of each of which are incorporated herein by reference.

BACKGROUND

1. Field

Various embodiments of the present invention relate to an electronic device providing the user's activity information and activity information of other users, which have been received from external electronic devices, and a method of operating the electronic device.

2. Description of the Related Art

Smartphones or other portable electronic devices may provide users with various applications with various functionalities, and various applications may be participated in and used by a single user or multiple users. A portable electronic device providing an application participated in by multiple users may display activity information of the user related to the application along with other users' activity information received from other external electronic devices. For example, a mobile game application allows multiple users to participate in a game, and the users participating in the game may be competitors against each other, and each user may identify the results of the game of the other users and be provided with the results of the game of his or her own. Participating in the mobile game is not limited to a particular user, but a user participating in the game may have an interest in, e.g., whether specific persons, with whom the user has a social relationship among numerous users participating in the mobile game, are in the game and the results of game. By reflecting this, the mobile game service may provide the function of configuring a friend list for the user and sharing information for the game with the friends.

SUMMARY

A device providing an application multiple users participate in may provide the function of allowing activity data for target weight loss to be shared with friends in the weight management group via a weight managing application. Specifically, the weight managing application may be operated based on, e.g., the users' calorie intake-related information or calorie consumption-related information, obtain the user's calorie consumption based on walking, running, and stair climbing activity via a sensor, and provide the user with the activity information. As such, the activity information is stream data which is continuously measured and accrued over time and generated and stored even while the application is not executed directly. Since the user's activity data is continuously generated, upload to the server for updating the current state may be more frequent, and the client may resultantly consume more data and battery. To provide activity information for a desired friend to multiple users in real-time, the server should continuously receive activity data from the multiple users, and this raises server operation costs.

According to various embodiments, the electronic device may share information related to the service, multiple users are participating in, with external electronic devices corresponding to users directly or via a server. According to various embodiments, the electronic device may periodically transmit data related to the designated kind of activity obtained by the sensor to the server and may transmit activity state information to the friend requesting the state information related to the designated kind of activity directly and in real-time.

According to various embodiments, the electronic device may receive, from the server, information related to the designated kind of activity for the users with whom the user has a social relation and may receive the activity state information for the users from the external electronic device in real-time.

According to various embodiments, the electronic device may receive the information stored in the server for the service related to the designated kind of activity according to an update period and information received in real-time from the external electronic device corresponding to the friend.

According to various embodiments of the present invention, an electronic device comprises at least one communication module, a display, and a processor configured to receive, from a server, first data related to a result of an activity which one or more users have performed before in relation to a designated kind of activity, through the at least one communication module, receive, from one or more external electronic devices corresponding to the one or more users, second data related to a state of an activity being performed in relation to the designated kind of activity obtained by the one or more external electronic devices, through the at least one communication module, and display the first data, the second data, third data related to the result of the activity of a user of the electronic device, and fourth data related to the user's activity state, on the display.

According to various embodiments of the present invention, a method for operating an electronic device comprises receiving, from a server, first data related to a result of an activity which one or more users have performed before in relation to a designated kind of activity, through at least one communication module, receiving, from one or more external electronic devices corresponding to the one or more users, second data related to a state of an activity being performed in relation to the designated kind of activity obtained by the one or more external electronic devices, through the at least one communication module, and displaying the first data, the second data, third data related to the result of the activity of a user of the electronic device, and fourth data related to the user's activity state, on a display.

According to various embodiments of the present invention, there may be provided non-transitory computer-readable recording medium storing instructions configured to perform at least one operation by a processor, the at least one operation comprising receiving, from a server, first data related to a result of an activity which one or more users have performed before in relation to a designated kind of activity, through at least one communication module, receiving, from one or more external electronic devices corresponding to the one or more users, second data related to a state of an activity being performed in relation to the designated kind of activity obtained by the one or more external electronic devices, through the at least one communication module, and displaying the first data, the second data, third data related to the result of the activity of a user of the electronic device, and fourth data related to the user's activity state, on a display.

According to various embodiments, to provide the user's activity information and other users' activity information received from external electronic devices, the electronic device may receive the state information for one or more users with whom he or she has a social relationship directly from the one or more users when needed and may receive result information which the one or more users have uploaded to a server according to upload periods from the server, thereby effectively saving server operation costs and preventing unnecessary data and battery consumption in the client.

BRIEF DESCRIPTION OF THE DRAWINGS

FIG. 7 is a view illustrating an example push message in which an electronic device requests state information related to a designated kind of activity according to various embodiments;

FIG. 8 is a view illustrating an example push message containing state information related to a designated kind of activity received by an electronic device according to various embodiments;

DETAILED DESCRIPTION

Figure 1:
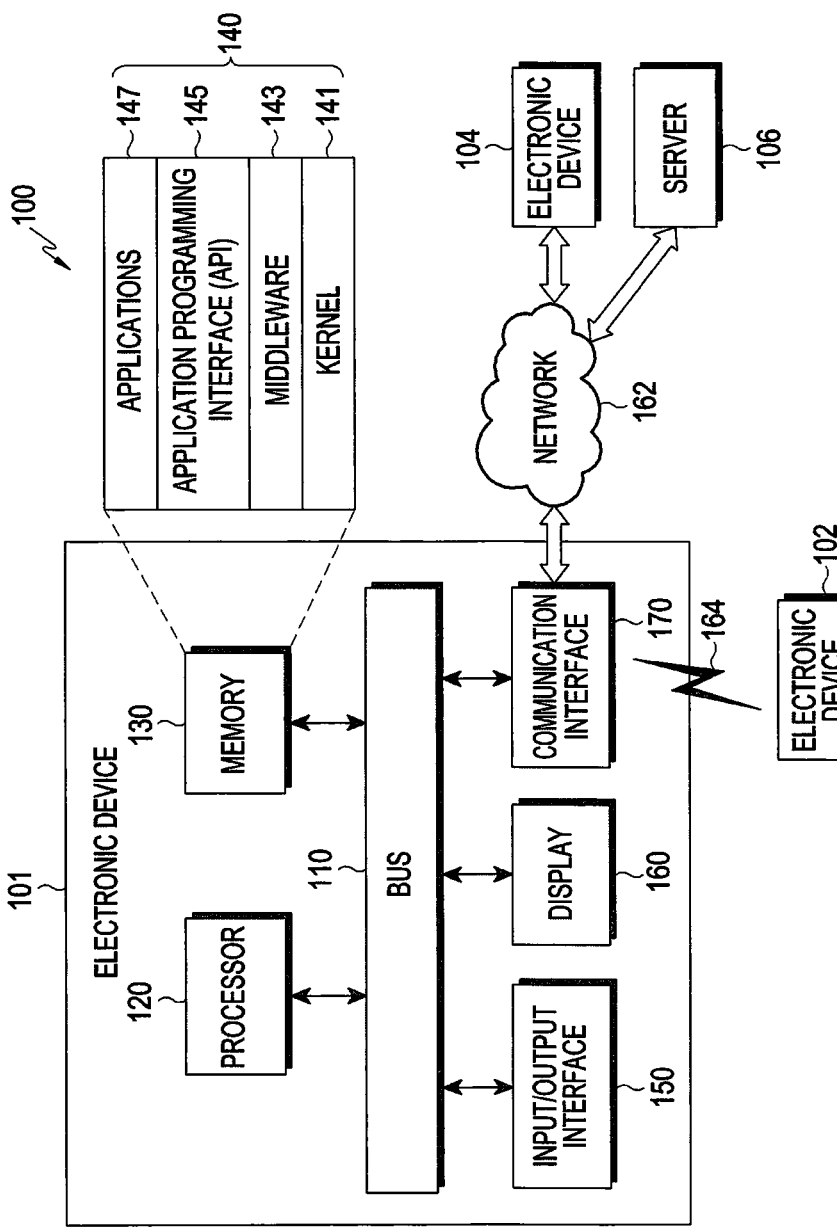
FIG. 1 is a block diagram illustrating an electronic device and a network according to various embodiments of the present invention.

Hereinafter, various embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), an MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a dryer, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to other embodiments, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler). According to some embodiments, examples of the electronic device may be at least one of part of a piece of furniture, building/ structure or vehicle, an electronic board, an electronic signature receiving device, a projector, or various measurement devices (e.g., devices for measuring water, electricity, gas, or electromagnetic waves). According to various embodiments, the electronic device may be flexible or may be a combination of the above-enumerated electronic devices. According to an embodiment of the disclosure, the electronic devices are not limited to those described above. As used herein, the term "user" may denote a human or another device (e.g., an artificial intelligent electronic device) using the electronic device.

Referring to FIG. 1, according to various embodiments, an electronic device 100 is included in a network environment 101. The electronic device 101 may include a bus 110, a processor 120, a memory 130, an input/output interface 150, a display 160, and a communication interface 170. In some embodiments, the electronic device 101 may exclude at least one of the components or may add another component. The bus 110 may include a circuit for connecting the components 110 to 170 with one another and transferring communications (e.g., control messages or data) between the components. The processor 120 may include one or more of a central processing unit (CPU), an application processor (AP), or a communication processor (CP). The processor 120 may perform control on at least one of the other components of the electronic device 101, or perform an operation or data processing relating to communication.

The memory 130 may include a volatile or non-volatile memory. For example, the memory 130 may store commands or data related to at least one other component of the electronic device 101. According to an embodiment, the memory 130 may store software or a program 140. The program 140 may include, e.g., a kernel 141, middleware 143, an application programming interface (API) 145, or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate data with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 145 may include at least one interface or function (e.g., a command) for filing control, window control, image processing or text control. For example, the input/output interface 150 may transfer commands or data input from the user or other external device to other component(s) of the electronic device 101 or may output commands or data received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user. For example, the communication interface 170 may set up communication between the electronic device 101 and an external device (e.g., a first electronic device 102, a second electronic device 104, or a server 106). For example, the communication interface 170 may be connected with a network 162 through wireless communication or wired communication and may communicate with an external device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment, the wireless communication may include at least one of, e.g., wireless-fidelity (Wi-Fi), light-fidelity (Li-Fi), Bluetooth, Bluetooth low power (BLE), Zigbee, near-field communication (NFC), magnetic secure transmission (MST), radio frequency (RF), or body area network (BAN) as denoted as short-range communication module 164 of FIG. 1. According to an embodiment, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to various embodiments, all or some of operations executed on the electronic device 101 may be executed on another or multiple other electronic devices (e.g., the electronic devices 102 and 104 or server 106). According to an embodiment, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

According to various embodiments of the present invention, an electronic device 101 comprises at least one communication module 170, a display 160, and a processor 120 configured to receive, from a server 106, first data related to a result of an activity which one or more users have performed before in relation to a designated kind of activity, using the at least one communication module 170, receive, from one or more external electronic devices (e.g., 102 and 104) corresponding to the one or more users, second data related to a state of an activity being performed in relation to the designated kind of activity obtained by the one or more external electronic devices (e.g., 102 and 104), using the at least one communication module 170, and display 160 the first data, the second data, third data related to the result of the activity of a user of the electronic device 101, and fourth data related to the user's activity state, using the display 160.

According to various embodiments of the present invention, the processor 120 may be configured to transmit, to another server (not shown), request data containing identification information for the one or more users for requesting the second data and type information for the activity state, using the at least one communication module 170, as part of receiving the second data.

According to various embodiments of the present invention, the processor 120 may display the activity state of at least some of the at least one user in a designated state if failing to receive the second data.

According to various embodiments of the present invention, the electronic device 101 may further comprise a sensor (not shown), wherein the processor 120 may be configured to obtain the third data based on at least part of sensing data obtained using the sensor (not shown) and transmit the third data to the server 106 using the at least one communication module 170.

According to various embodiments of the present invention, the processor 120 may be configured to perform the transmission according to a predetermined period.

According to various embodiments of the present invention, the electronic device 101 may further comprise a memory configured to store the first data, wherein the processor 120 may be configured to, as part of receiving the first data, identify a time of reception of the first data stored in the memory and, if the first data in the server 106 is updated after the time of reception, receive the first data from the server 106.

According to various embodiments of the present invention, the processor 120 may be configured to receive, from the server 106, information for a plurality of users participating in the designated kind of activity, using the at least one communication module 170 and determine that at least some duplicate ones of the plurality of users participating in the designated kind of activity among a plurality of users stored in the electronic device 101 are the one or more users. The processor 120 may be configured to determine that at least some selected from among the one or more users, corresponding to a user input for the user of the electronic device 101 to add a friend of interest, are the one or more users.

According to various embodiments of the present invention, the processor 120 may be configured to display the second data and the fourth data using an icon designated corresponding to the designated kind of activity.

According to various embodiments of the present invention, the processor 120 may be configured to receive a request for transmission of the fourth data to at least one of the one or more external electronic devices (e.g., 102 and 104), using the at least one communication module 170 and, in response to the request of transmission, transmit the fourth data to the at least one external electronic device (e.g., 102 and 104), using the at least one communication module 170.

According to various embodiments of the present invention, the processor 120 may be configured to receive the request for transmission to the at least one external electronic device (e.g., 102 and 104) via another server or transmit the fourth data to the at least one external electronic device (e.g., 102 and 104), using the at least one communication module 170. According to various embodiments of the present invention, the processor 120 may be configured to, as at least part of transmitting to the at least one external electronic device (e.g., 102 and 104), identify a user corresponding to the at least one external electronic device (e.g., 102 and 104) based on at least the request for transmission and, when the identified user belongs to a designated information disclosure scope, perform the transmission.

Figure 2:
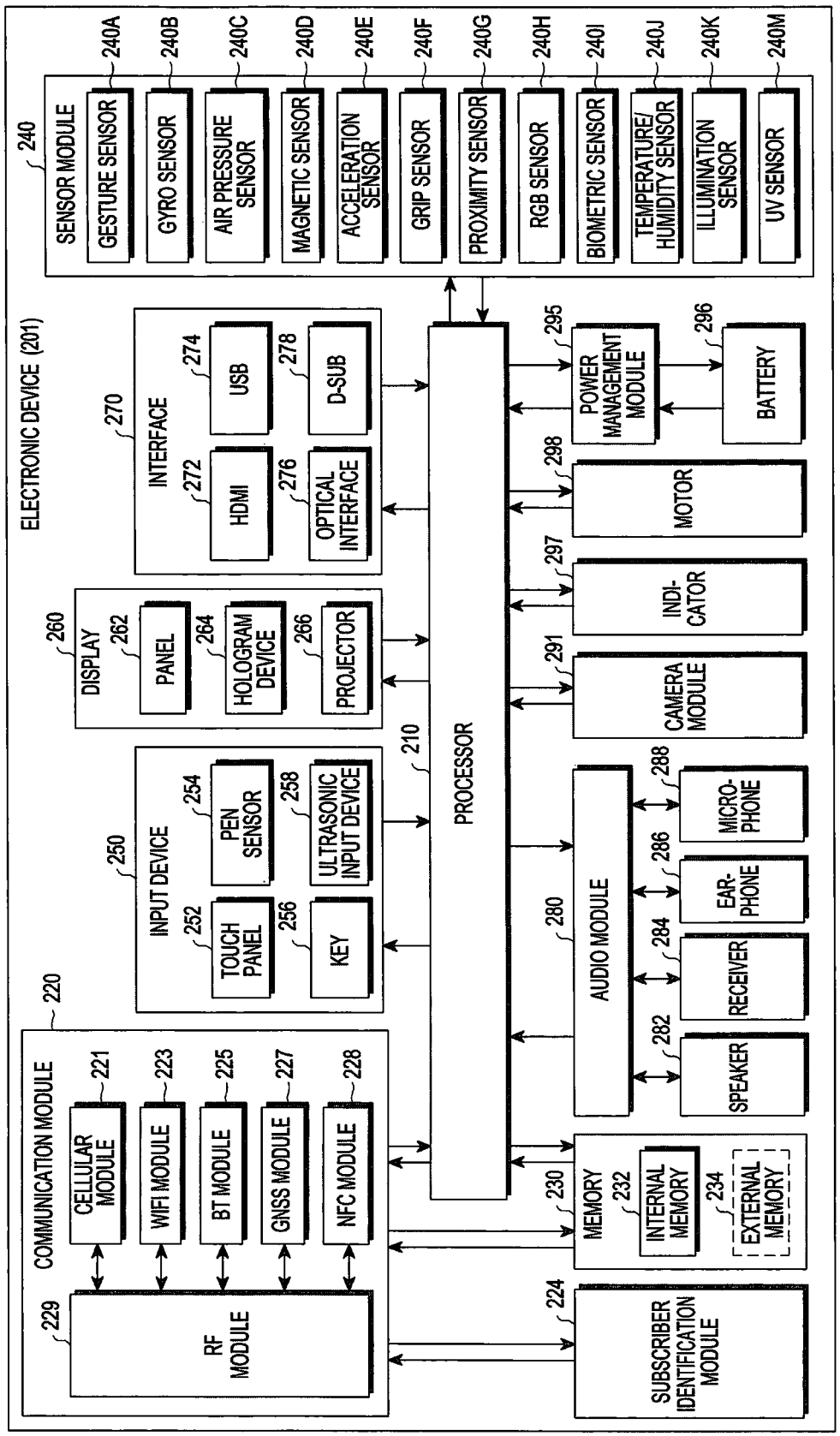
FIG. 2 is a block diagram illustrating an electronic device according to various embodiment.

FIG. 2 is a block diagram illustrating an electronic device 201 according to various embodiments. The electronic device 201 may include the whole or part of the configuration of, e.g., the electronic device 101 shown in FIG. 1. The electronic device 201 may include one or more processors (e.g., application processors (APs)) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298. The processor 210 may control multiple hardware and software components connected to the processor 210 by running, e.g., an operating system or application programs, and the processor 210 may process and compute various data. The processor 210 may be implemented in, e.g., a system on chip (SoC). According to an embodiment, the processor 210 may further include a graphic processing unit (GPU) or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include, e.g., a cellular module 221, a wireless fidelity (Wi-Fi) module 223, a Bluetooth (BT) module 225, a GNSS module 227, a NFC module 228, and a RF module 229. The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment, the cellular module 221 may perform at least some of the functions providable by the processor 210. According to an embodiment, the cellular module 221 may include a communication processor (CP). According to an embodiment, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals). The RF module 229 may include, e.g., a transceiver, a power amp module (PAM), a frequency filter, a low noise amplifier (LNA), or an antenna. According to another embodiment, at least one of the cellular module 221, the Wi-Fi module 223, the Bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. For example, the internal memory 232 may include at least one of a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a memory stick. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a red-green-blue (RGB) sensor, a bio sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, or a control circuit for controlling the same. The panel 262 may be implemented to be flexible, transparent, or wearable. The panel 262, together with the touch panel 252, may be configured in one or more modules. According to an embodiment, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288. For example, the camera module 291 may be a device for capturing still images and videos, and may include, According to an embodiment, one or more image sensors (e.g., front and back sensors), a lens, an image signal processor (ISP), or a flash such as an LED or xenon lamp. The power manager module 295 may manage power of the electronic device 201, for example. According to an embodiment, the power manager module 295 may include a power management Integrated circuit (PMIC), a charger IC, or a battery or fuel gauge. The PMIC may have a wired or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and May generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
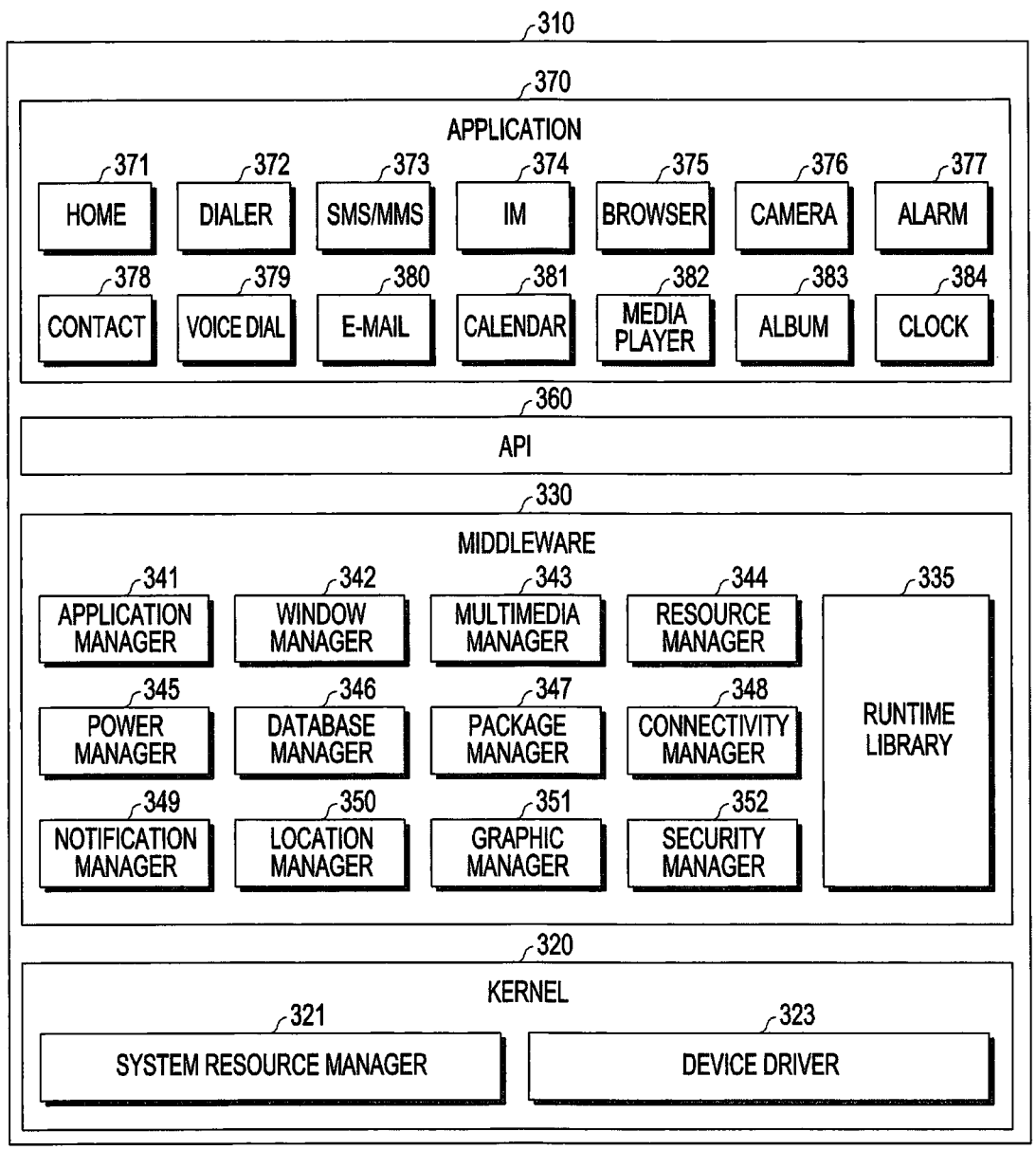
FIG. 3 is a block diagram illustrating a program module according to various embodiment.

FIG. 3 is a block diagram illustrating a program module according to various embodiments. According to an embodiment, the program module 310 (e.g., the program 140) may include an operating system (OS) controlling resources related to the electronic device (e.g., the electronic device 101) or various applications (e.g., the application processor 147) driven on the operating system. The operating system may include, e.g., Android™, iOS™, Windows™, Symbian™, Tizen™, or Bada™. Referring to FIG. 3, the program module 310 may include a kernel 320 (e.g., the kernel 141), middleware 330 (e.g., the middleware 143), an API 360 (e.g., the API 145), or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370. According to an embodiment, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341, for example, may manage the life cycle of the application 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the capacity, temperature, or power of the battery and determine and provide power information necessary for the operation of the electronic device using a corresponding piece of information of such. According to an embodiment, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment, the middleware 330 may include a telephony manager for managing the voice or video call function of the electronic device or a middleware module able to form a combination of the functions of the above-described elements. According to an embodiment, the middleware 330 may provide a module specified according to the type of the operating system. The middleware 330 may dynamically omit some existing components or add new components. The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384, health-care (e.g., measuring the degree of workout or blood sugar), or provision of environmental information (e.g., provision of air pressure, moisture, or temperature information). According to an embodiment, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment, the application 370 may include an application (e.g., a health-care application of a mobile medical device) designated according to an attribute of the external electronic device. According to an embodiment, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

As used herein, the term "module" includes a unit configured in hardware, software, or firmware and may interchangeably be used with other terms, e.g., "logic," "logic block," "part," or "circuit." The module may be a single integral part or a minimum unit or part of performing one or more functions. The module may be implemented mechanically or electronically and may include, e.g., an application-specific integrated circuit (ASIC) chip, field-programmable gate arrays (FPGAs), or programmable logic device, that has been known or to be developed in the future as performing some operations. According to various embodiments, at least a part of the device (e.g., modules or their functions) or method (e.g., operations) may be implemented as instructions stored in a non-transitory computer-readable storage medium (e.g., the memory 130), e.g., in the form of a program module. The instructions, when executed by a processor (e.g., the processor 120), may enable the processor to carry out a corresponding function. The non-transitory computer-readable medium may include, e.g., a hard disk, a floppy disc, a magnetic medium (e.g., magnetic tape), an optical recording medium (e.g., compact disc-read only memory (CD-ROM), digital versatile disc (DVD), magnetic-optical medium (e.g., floptical disk), or an embedded memory. The instruction may include a code created by a compiler or a code executable by an interpreter. Modules or programming modules in accordance with various embodiments may include at least one or more of the aforementioned components, omit some of them, or further include other additional components. Operations performed by modules, programming modules or other components in accordance with various embodiments may be carried out sequentially, in parallel, repeatedly or heuristically, or at least some operations may be executed in a different order or omitted or other operations may be added.

Figure 4:
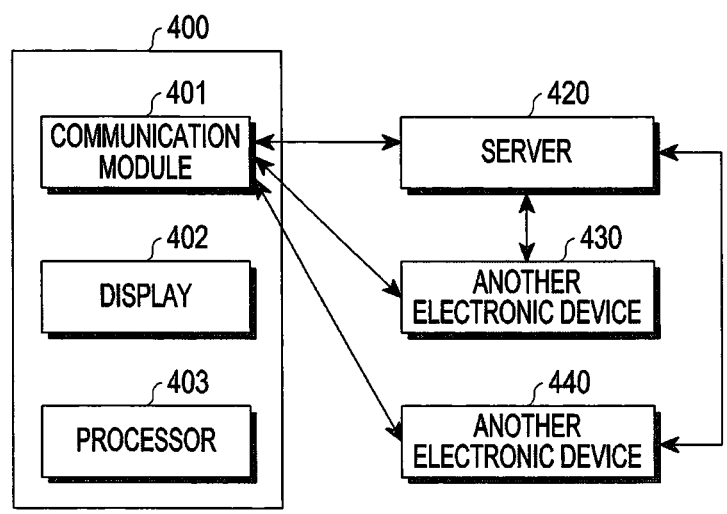
FIG. 4 is a block diagram illustrating an electronic device displaying data related to a designated kind of activity according to various embodiments.

FIG. 4 is a block diagram illustrating an electronic device displaying data related to a designated kind of activity according to various embodiments. According to an embodiment, a processor 403 (e.g., the processor 120 or 210) may receive first data related to a result of an activity, which one or more users have performed before in relation to a designated kind of activity, from a server 420 (e.g., the server 106) using the at least one communication module 401 (e.g., the communication module 220).

According to various embodiments, the one or more users may be users who are participating in the designated kind of activity. The electronic device 400 (e.g., the electronic device 101 or 201) may receive information for the one or more users from the server 420 storing the data related to the designated kind of activity. Or, the electronic device 400 may constitute the one or more users of users participating in the designated kind of activity, corresponding to a user list stored in the electronic device 400. One or more users participating in the designated kind of activity among a plurality of users with whom the user of the electronic device 400 has a social relationship, e.g., friends, family members, or acquaintances, may be the one or more users.

According to various embodiments, the designated kind of activity may be walking, running, cycling, stair climbing, sleeping, blood pressure variations, calorie consumption, or squad activity performed by the user of the electronic device 400 or one or more users. According to various embodiments, various types of activities may be defined and applied in relation to the body activities that the user of the electronic device 400 does, with the electronic device 400 carried and should not be interpreted as limited to the designated kinds of activity described as an example.

According to various embodiments, the electronic device 400 may obtain data for when and how long the user of the electronic device 400 has walked using a sensor module (not shown) embedded in the electronic device 400. Or, the electronic device 400 may obtain the heartrate data of the user of the electronic device 400 during a predetermined time using a heartrate sensor embedded in the electronic device 400. According to various embodiments, the designated kind of activity may be information that an application, which the electronic device 400 and the server 420 may provide, may reference in relation to the application. As an example, walking-related data may be provided to the users daily or information about whether the goal is achieved and/or goal achieving process step information may be provided on a predetermined-time basis via an application which provides a walk-10,000 steps-a-day challenge. As another example, whether the target weight loss is achieved may be provided to the users based on calorie-intake-related data and calorie-consumption-related data via an application which provides a weight managing program. In the above examples, the designated kind of activity may be walking, running, or cycling, which is related to calorie consumption, and diet or sleep activity, which is related to calorie intake. According to various embodiments, there may be one or more activities of the designated kind which are used by the application provided from the server 420 and the electronic device 400.

According to various embodiments, the first data which is related to the result of activity the one or more users have done before in relation to the designated kind of activity may represent data stored in the server 420. If one or more external electronic devices (e.g., 430 and 440) corresponding to the one or more users upload, onto the server 420, the data related to the designated kind of activity which the external electronic devices (e.g., 430 and 440) have obtained during a predetermined period, the electronic device 400 may receive the first data stored in the server 420 using the communication module 401. The electronic device 400 may further comprise a memory (not shown) for storing the first data. The processor 403 may identify a time of reception of the first data and, if the first data in the server 420 is updated after the time of reception, receive the first data from the server 420. Otherwise, the first data need not be received from the server 420 since the first data previously stored in the memory of the electronic device 400 is the same as the latest first data updated in the server 420. The one or more users may upload the first data obtained from the external electronic devices (e.g., 430 and 440) corresponding to the one or more users onto the server 420 at each predetermined period, and the electronic device 400 may receive the first data stored in the server 420 at each predetermined period. Or, the electronic device 400 may receive the first data stored in the server 420 by the user's request or a request for a predetermined type of activity. According to various embodiments, the external electronic devices (e.g., 430 and 440) may upload (or download) the first data corresponding to stream data onto (or from) the server at each predetermined period, rather than continuously, so as to prevent data and battery consumption and save operation costs for the server 420. According to various embodiments, it is possible to prevent data and battery waste and a rise in operation costs of the server 420 which may arise when the external electronic devices (e.g., 430 and 440) continuously upload the first data onto the server 420 or the electronic device 400 steadily downloads the first data from the server 420.

According to various embodiments, the server 420 may store the data related to the designated kind of activity and provide an application related to the designated kind of activity.

The processor 403 may receive, from one or more external electronic devices (e.g., 430 and 440) corresponding to the one or more users, second data related to a state of an activity being performed in relation to the designated kind of activity obtained by the one or more external electronic devices (e.g., 430 and 440), using the at least one communication module 401. The second data obtained by the external electronic devices (e.g., 430 and 440) may mean data that the external electronic devices (e.g., 430 and 440) have obtained for the activity state for one or more users within a predetermined time to respond to a request for the second data. For example, if the designated kind of activity is walking, a first user may be walking during a particular time for responding to a request for the second data, a second user may be stationary during a particular time for responding to a request for the second data, and a third user may be running during a particular time for responding to a request for the second data. The second data for the first user and the third user may be in an active state, and the second data for the second user may be in an inactive state. According to various embodiments, rather than receiving the first data stored in the server 420 from the server 420, the processor 403 may receive, from the one or more external electronic devices (e.g., 430 and 440), information for the activity state of each user within the particular time for responding to the request for the second data from each of the external electronic devices (e.g., 430 and 440) corresponding to the users.

According to various embodiments, as at least part of receiving the second data, the processor 120 may transmit, to another server (not shown), request data containing identification information for the one or more users for requesting the second data and type information for the activity state, using the at least one communication module 220. 'Another server' may refer to a server (not shown) different from the server 420 storing the first data. As an example, the other server may be implemented as an IP push server. According to various embodiments, the other server may serve to send a request for the second data related to the designated kind of activity to the users identified using the user identification information transmitted by the electronic device 400, receive the second data transmitted from each user, and transfer the second data back to the electronic device 400. As an example, the other server may send a request for the second data to, or receive the second data from, the one or more users using a push message, which is described below in detail with reference to FIGS. 7 and 8.

The processor 403 may identify the request for the activity state related to the designated kind of activity for the user of the electronic device 400 and other users. The request may be identified corresponding to the user of the electronic device 400 executing the application related to the designated kind of activity. For example, for the user of the electronic device 400 to execute the application related to the designated kind of activity to receive the activity state information related to the designated kind of activity for the user of the electronic device 400 and the user's friends, the processor 403 may send a request for the second data to one or more users corresponding to the user's friends, corresponding to execution of the application, and receive the second data. Corresponding to the user of the electronic device 400 performing the designated kind of activity, the request may be identified, or the request may be identified directly by a user input. According to various embodiments, the user input may be entered variously via a user interface. For example, the request may be identified as the user of the electronic device 400 touches a reload icon provided on the execution screen of the application related to the designated kind of activity. Or, the request related to the designated kind of activity may be generated at each predetermined time, and the predetermined time may be set by the user of the electronic device 400 or may be received from the server 420. The second data may be received within a predetermined time in response to the request related to the designated kind of activity. The processor 430 may be configured to display activity states of at least some of the one or more users to a designated state if failing to receive the second data.

The processor 403 may display the first data, the second data, third data related to the result of the activity of a user of the electronic device 400, and fourth data related to the user's activity state, using the display 402 (e.g., the display 160 or 260). The processor 403 may provide an execution screen of the application related to the designated kind of activity to the user using the display 402. The screen may include data (e.g., the third data related to the activity result and the fourth data related to the activity state) related to the designated kind of activity for the user of the electronic device 400 and may include data (e.g., the first data related to the activity result and the second data related to the activity state) related to the designated kind of activity for other users, such as friends, acquaintances, or family members of the user of the electronic device 400. An example of the screen is described below with reference to FIG. 5.

According to various embodiments, the second data and the fourth data denote the state of activity being performed in relation to the designated kind of activity obtained from one or more external electronic devices (e.g., 430 and 440) or the electronic device 400. The processor 403 may display the second data and fourth data using an icon designated corresponding to the designated kind of activity. For example, if the first user's activity state is related to walking, the second data for the first user may be displayed in an icon which looks as if a person is running and, if the user of the electronic device 400 is in an inactive state, the fourth data for the user of the electronic device 400 may be displayed in an icon which looks as if a human is sleeping. These icons may intuitively represent the type of the designated kind of activity and may be image information for intuitively providing real-time information on the screen.

According to various embodiments, the processor 403 may graphically represent a set goal on the execution screen of the application related to the designated kind of activity, using the display 402. The first data and the third data, along with the set goal represented graphically, may be displayed. As an example, the processor 403 may determine whether the set goal has been achieved based on the first data, specify a position for the first data of the set goal according to a result of determination, and display the first data in the position. The first data may be data for the one or more users, and a corresponding user icon may be disposed in the specified position of the set goal using a designated user icon corresponding to each user. Or, the processor 403 may specify a position for the fourth data of the set goal and display. Or, the processor 403 may represent the set goal as a value using the display 402 and may represent the third data and the first data as relative probability values (e.g., percentage) indicating the degree of achievement of the set goal value.

According to various embodiments, the processor 403 may display, using the display 402, a relative ranking of the first data and a relative ranking of the third data, among the plurality of users which have participated in the designated kind of activity, including all of the first data and the second data.

Figure 5:
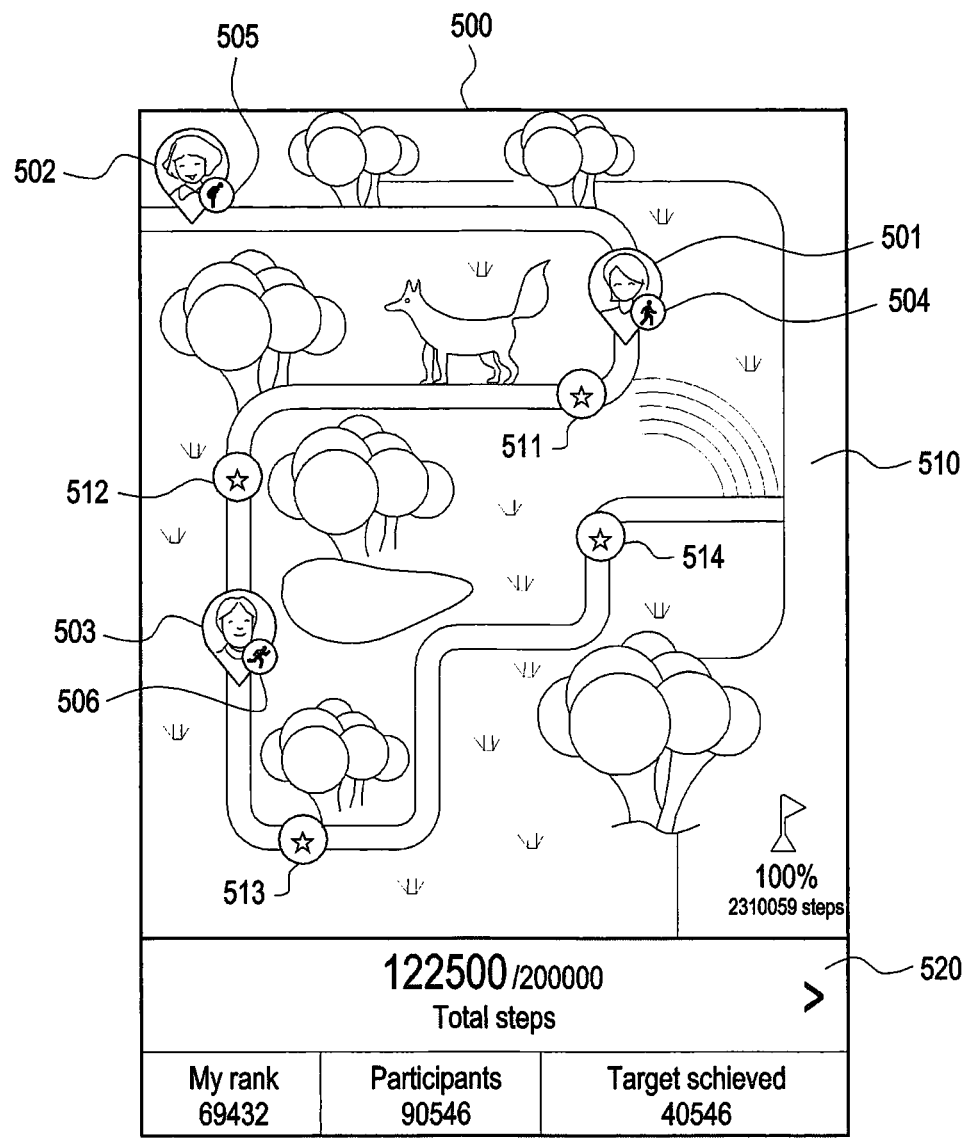
FIG. 5 is a screen on which an electronic device displays a designated kind of activity according to various embodiments.

FIG. 5 is a screen on which an electronic device displays a designated kind of activity according to various embodiments. According to various embodiments, the electronic device 201 is described in connection with a walking challenge-related application, as an example. The designated kind of activity used for the walking challenge may include walking and running activity.

According to various embodiments, the electronic device 201 may represent a background 510 including a road and detailed items 520 for the goal set in the walking challenge on the screen 500, using the display 260. The road included in the background 510 has a start point and a target end and one or more intervening targets and may be represented variously according to the set goal. The detailed items 520 may include, e.g., a value item which is the representation of the goal, ranking information for the user of the electronic device 201, number of users participating in the walking challenge, and number of users who have achieved the goal.

According to various embodiments, the electronic device 201 may display user icons 501, 502, and 503 which represent the users participating in the walking challenge including the user of the electronic device 201, using the display 260. For example, the user icon representing the user of the electronic device 201 may be 501, and the user icons representing friends who the user of the electronic device 201 selected as friends of interest among the plurality of users participating in the walking challenge may be 502 and 503.

According to various embodiments, upon receiving an input for selecting one of the user icons 501, 502, and 503 displayed on the display 260, the processor 210 may display the ranking information for the challenge for the user corresponding to the selected user icon or the current state information as the detailed items 520.

According to various embodiments, the electronic device 201 may determine where the third data related to the result of activity that the user of the electronic device 201 has performed in relation to the designated kind of activity is positioned on the road included in the background 510 in area 510 and place the user icon 501 corresponding to the user of the electronic device 201 in a particular position, e.g., position 501. The electronic device 201 may place friend user icons 502 and 503 in the positions determined depending on the degree of achievement of the set goal on the road in the background 510 based on the first data for the friends of the user of the electronic device 201. It can be shown from FIG. 5 that the friend user icon 502 is in the position where the set goal begins, the user icon 501 for the electronic device 201 is positioned immediately before achieving the first target 511 of the set goal, and another friend user icon 503 is positioned after achieving the second target 512 and before achieving the third target 513. The fourth target 514 may correspond to the final target. The friend user icons 502 and 503 may be arranged based on the first data stored in the server, and the user icon 501 may be positioned based on the third data obtained from the electronic device 201 in response to a request for the designated kind of activity. According to various embodiments, the electronic device 201 may upload the third data onto the server based on a predetermined period.

According to various embodiments, in response to the request related to the designated activity, the electronic device 201 may display the fourth data related to the state of the activity, which the user of the electronic device 201 is performing in relation to the designated activity, as a sub icon 504, along with the user icon 501. The sub icon may be determined depending on the type of the designated kind of activity. For example, a ready state icon 505, active state icons 504 and 506, or an inactive state icon (not shown) may be displayed as shown in FIG. 5. According to various embodiments, the sub icon is described below in greater detail with reference to FIG. 10.

Figure 6:
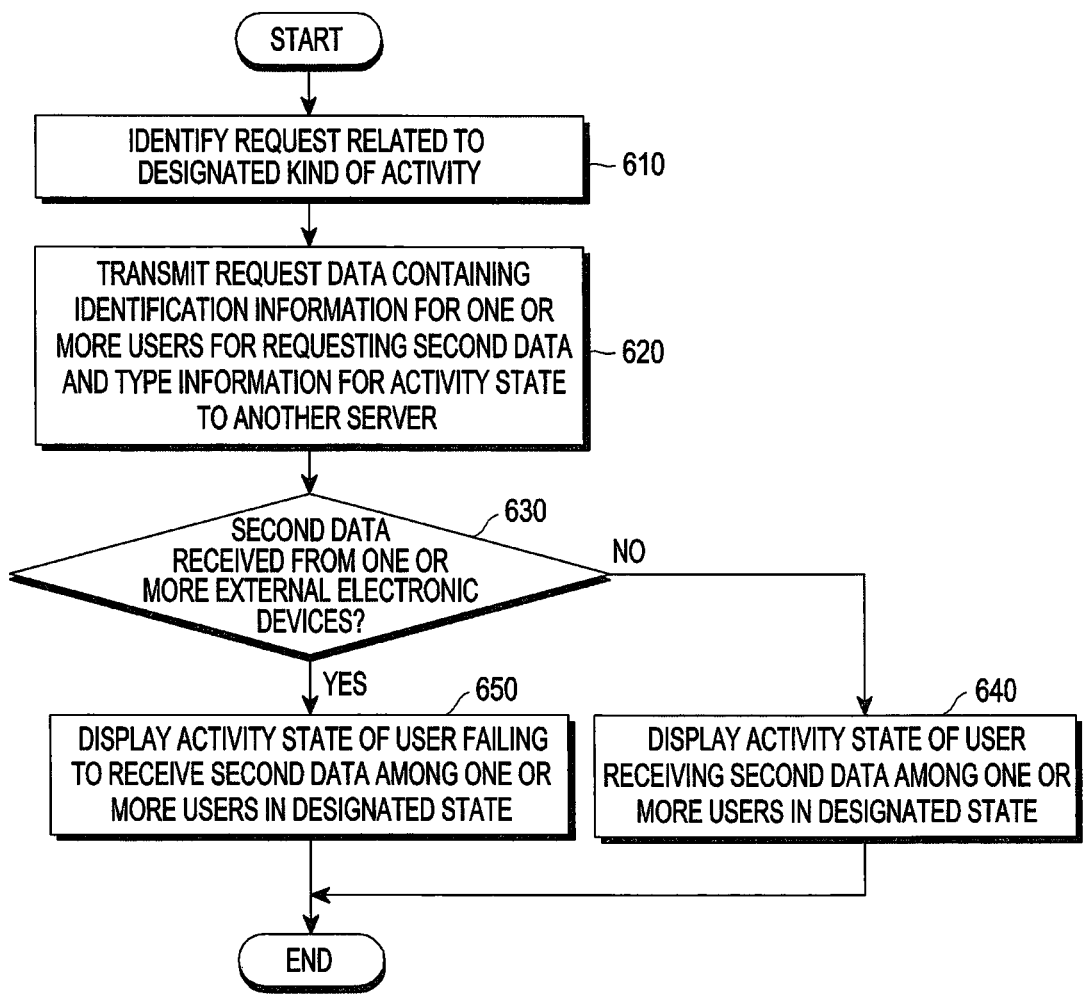
FIG. 6 is a flowchart illustrating a method of displaying another user's state information related to a designated kind of activity by an electronic device according to various embodiments.

FIG. 6 is a flowchart illustrating a method of displaying another user's state information related to a designated kind of activity by an electronic device according to various embodiments.

In operation 610, according to various embodiments, the electronic device 201 (or the processor 210) may identify a request related to a designated kind of activity. The designated kind of activity may be defined in relation to the body activity that the user of the electronic device 201, who is using an application provided from the electronic device 201, is doing with the electronic device 201 carried, and the designated kind of activity may be, e.g., walking, running, or cycling activity. The processor 210 may identify a request related to the designated kind of activity corresponding to execution of the application. For example, corresponding to the user of the electronic device 201 executing a walking activity-related application, the processor 210 may identify a request related to the walking activity, and the request may mean a request for displaying activity state data related to the walking activity for the user of the electronic device 201 and activity state data related to the walking activity for other users that the user of the electronic device 201 has registered as friends.

In operation 620, the processor 210 may transmit request data containing activity state type information and identification information for one or more users for requesting second data to another server through at least one communication module 220. The other server means a server that differs from the server (420 of FIG. 4) storing the activity result data (first data of FIG. 4) related to the designated kind of activity for one or more users. The server which has transmitted the first data is a server (420 of FIG. 4) which receives the first data from the external electronic devices (e.g., 430 and 440) corresponding to the one or more users and stores the first data, and the other server corresponds to a server which sends a request for activity state data (e.g., second data) related to the designated kind of activity to the one or more users, receives the second data from the external electronic devices (e.g., 430 and 440) corresponding to the one or more users in response to the request for the second data, and transmits the second data to the electronic device (400 of FIG. 4). For example, the other server may be an IP push server, process IP push messages, and play a role as an agent to request or receive second data between the electronic device 201 and other external electronic devices. For example, to send a request for second data to the external electronic devices corresponding to the users corresponding to friends, the processor 210 may transmit identification information for one or more users, such as a friend list, and type information for the activity state for the designated kind of activity which may indicate the second data, to the push server capable of generating and transmitting push messages. The push server may receive activity state type information and identification information for the users for requesting the second data and transmit push messages to the external electronic devices corresponding to the identified users. The push server may receive the second data for the activity state information for each external electronic device, which the external electronic device has transmitted corresponding to the push message, and transmit the second data to the electronic device 201.

In operation 630, the processor 210 may determine whether the second data has been received from one or more external electronic devices. According to various embodiments, the processor 210 may receive the second data in response to the request related to the designated kind of activity of operation 610 and determine whether the second data is received within a predetermined time of the time when the request was made. Upon receiving the second data from the external electronic device within the predetermined time, the processor 210 may display the received second data on the display 260 in operation 650. In contrast, if failing to receive the second data from the external electronic device within the predetermined time, the processor 210 may display the activity state of the at least one user who failed to receive the second data among the one or more users, in a designated state, on the display 260. At this time, the designated state denotes when the second data is not received and may be, e.g., an icon indicating the inactive state.

FIG. 7 is a view illustrating an example push message in which an electronic device requests state information related to a designated kind of activity according to various embodiments. As described above in connection with FIG. 6, according to various embodiments, the electronic device 201 (or the processor 210) may transmit activity state type information and identification information for one or more users to the other server to request the second data, and FIG. 7 illustrates a push message as an example thereof.

According to various embodiments, the electronic device 201 (or the processor 210) may configure java script object notation (JSON)-formatted information for sending a request for the second data to the server different from the server which provides the application related to the designated kind of activity and transmit the JSON-formatted information. For example, the request for the second data to the other server may be configured in push messages and be simultaneously transmitted to several recipients. Such second data request may be created in the JSON format. In FIG. 7, "message" may include USERNAME, USERID, and REQUEST_TYPE. USERNAME may indicate the name of the sender user, i.e., the user of the electronic device 201, USERID may be the unique ID for identifying the user, and REQUEST_TYPE may be an explicit message for the type corresponding to the request for the current state information. The identification information for the one or more users may be included in each recipient list and may be included in to_list as one or more recipients. At this time, to_index may be the index for the requested information and may designate what information is to be requested, e.g., such as 1 in the case of the current activity state information and 2 in the case of the latest HR measurement information. to_ID may be the USERID of the user requesting the information. The push server which has received the request for the JSON-formatted second data as shown in FIG. 7 may transfer the request message through IP push messages to the plurality of users USERID_1 to USERID_N.

FIG. 8 is a view illustrating an example push message containing state information related to a designated kind of activity received by an electronic device according to various embodiments. According to various embodiments, the electronic device 201 may receive the second data from the external electronic devices. FIG. 8 shows an example of receiving the second data as a push message.

According to various embodiments, the electronic device 201 (or the processor 210) may receive the second data from the external electronic devices corresponding to the one or more users. As at least part of receiving the second data, the processor 210 may send a request for the second data to the other server and receive, from the electronic device 201, the second data which the external electronic devices have transmitted to the other server. FIG. 8 illustrates an example of the second data received from the other server.

The push message which means the second data has been created in the JSON format of FIG. 8, and the "message" item may include USERNAME_1, USERID_1, and RESPONSE_TYPE. USERNAME_1 and USERID_1 may be items corresponding to USERID_1 of FIG. 7 and may represent the name information and ID information for identifying one or more users to which the user of the electronic device 201 has sent a request for the second data. RESPONSE_TYPE may indicate a reply to REQUEST_TYPE of FIG. 7, and RESPONSE_INDEX may indicate the type of data replied among the pieces of state information, and STATUS may indicate the value for the replied information.

Figure 9:
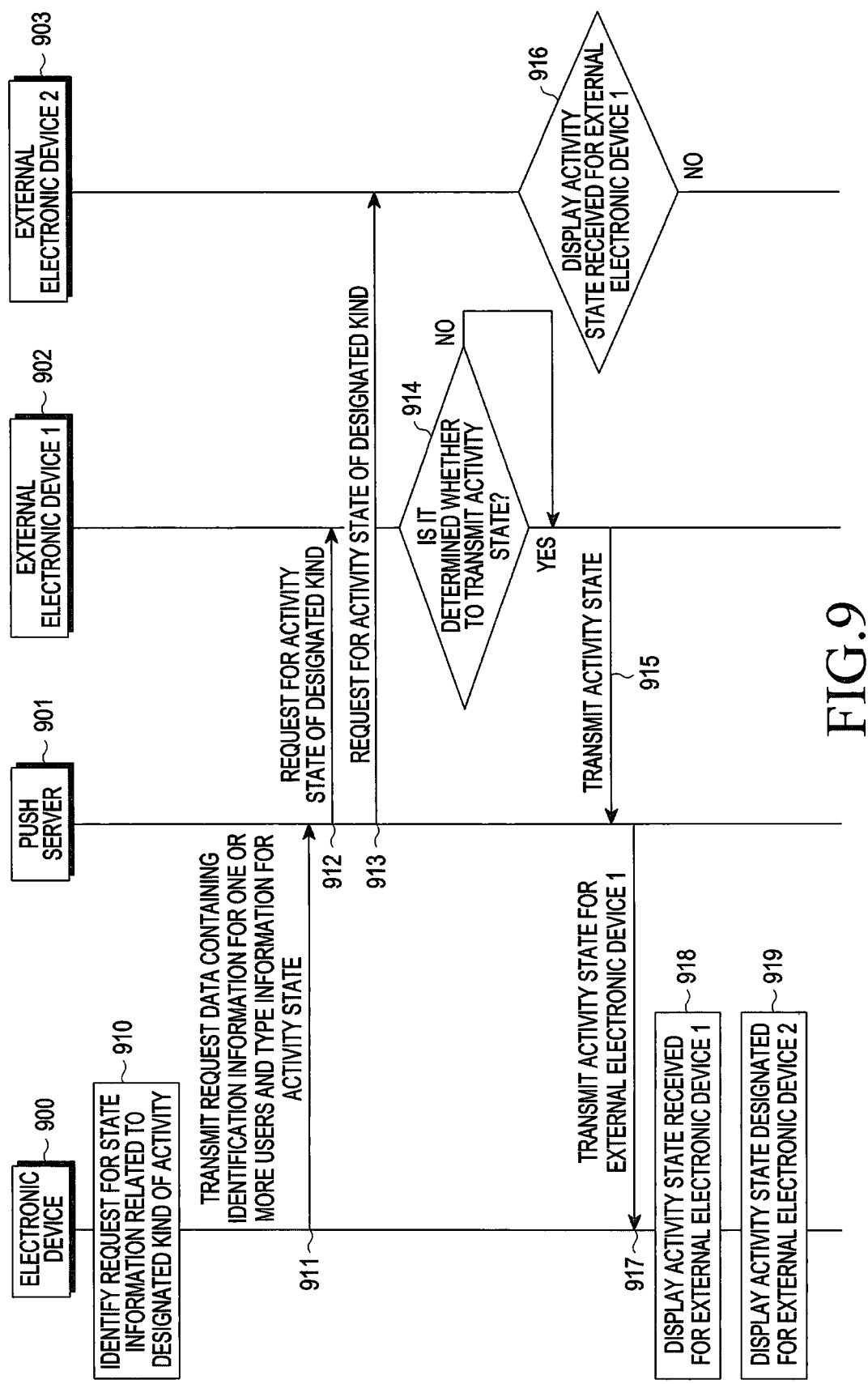
FIG. 9 is a sequence diagram illustrating a scenario in which an electronic device receives activity state information from another electronic device according to various embodiments.

FIG. 9 is a sequence diagram illustrating a scenario in which an electronic device receives activity state information from another electronic device according to various embodiments.

According to various embodiments, the electronic device 201 (or the processor 210) may receive second data related to the state of activity which one or more users are performing in relation to a designated activity, from external electronic devices corresponding to the one or more users. As an example, described in connection with FIG. 9 is a scenario case where the electronic device 900 (e.g., the electronic device 201) receives second data from external electronic device 1 902 and external electronic device 2 903 through a push server 901 and displays the second data.

In operation 910, the electronic device 900 may identify a request for the state information related to the designated kind of activity. The request may be identified according to execution of an application related to the designated kind of activity or may be identified according to a user input. According to various embodiments, the request may be a request for displaying activity state information for other users registered as friends of the user of the electronic device 900 on the execution screen of the application related to the designated kind of activity in the electronic device 900.

In response to the request, the electronic device 900 may send a request for the activity state information related to the designated kind to other users who are participating in the application related to the designated kind of activity and have a social relation, such as of friends, acquaintances, or family members, and receive the activity state information. In operation 911, the electronic device 900 may transmit request data containing identification information for the other users, who are stored in the friend list of the electronic device 900 and are participating in the designated kind of activity, i.e., the one or more users, and the activity state type information, to the push server 901.

The push server 901 may specify recipients to which push messages are to be transmitted according to the received identification information for the one or more users and may generate push messages containing the received activity state type information. Thus, the push server 901 may send a request for the designated kind of activity state (e.g., second data) to external electronic device 1 902 (operation 912) and send a request for the designated kind of activity state (e.g., second data) to external electronic device 2 903 (operation 913).

The external electronic devices 902 and 903 which have received the push messages containing the activity state type information from the push server 901 may obtain data related to the state of the activity that the users of the external electronic devices are doing in relation to the designated kind of activity and may determine whether to transmit the activity state (operations 914 and 916). In response to receiving the request for the second data, the external electronic devices may identify the electronic device which has sent the request and may determine whether to transmit the activity state depending on whether the identified electronic device 900 belongs to a predetermined information disclosure scope. According to various embodiments, a personal information protection setting may be provided in relation to providing real-time state information related to the designated kind of activity. The external electronic device (or the electronic device) corresponding to the user who has received the request for the data, i.e., the second data, related to the state of the activity being performed in relation to the designated kind of activity may set a disclosure scope for protecting the personal information for the user of the external electronic device. For example, the disclosure scope may be divided into non-disclosure, limited disclosure, and full disclosure based on the user who has requested the second data. At this time, the disclosure scope setting information may be previously shared among the users who have added the user of the external electronic device as a friend. Depending on the shared disclosure scope, the user may determine whether to send a request for second data to the user at the time of requesting the real-time data. Or, the user of the external electronic device may determine whether to transmit the second data, corresponding to any user requesting the second data without previously opening the disclosure scope setting information to the users who have added the user of the external electronic device as a friend.

For example, external electronic device 1 902 may determine to transmit the activity state corresponding to a request for a designated kind of activity state (operation 912) and transmit its activity state to the push server 901 (operation 915).

External electronic device 2 903 may determine not to transmit the activity state in operation 916, corresponding to a request for a designated kind of activity state (operation 913) and terminate the operation without transmitting its activity state to the push server 901.

Corresponding to operation 911 of requesting the second data, the push server 901 may transmit activity state information received during a designated time to the electronic device 900 which has requested the second data (operation 917).

The electronic device 900 may display the activity state received for external electronic device 1 (operation 918) and, due to failure to receive the activity state information within a designated time for external electronic device 2, display the designated state (operation 919). For example, the activity state of external electronic device 1 902 may be a running state, and the designated activity state of external electronic device 2 903 may be a sleeping state. Or, the message requesting the second data in real-time may fail to receive the second data depending on the network state of the electronic device who is to receive the request or the network state of the external electronic device which transmits the second data. Or, also included is the case where the second data is not transmitted according to the personal information protection setting as is with external electronic device 2.

Figure 10:
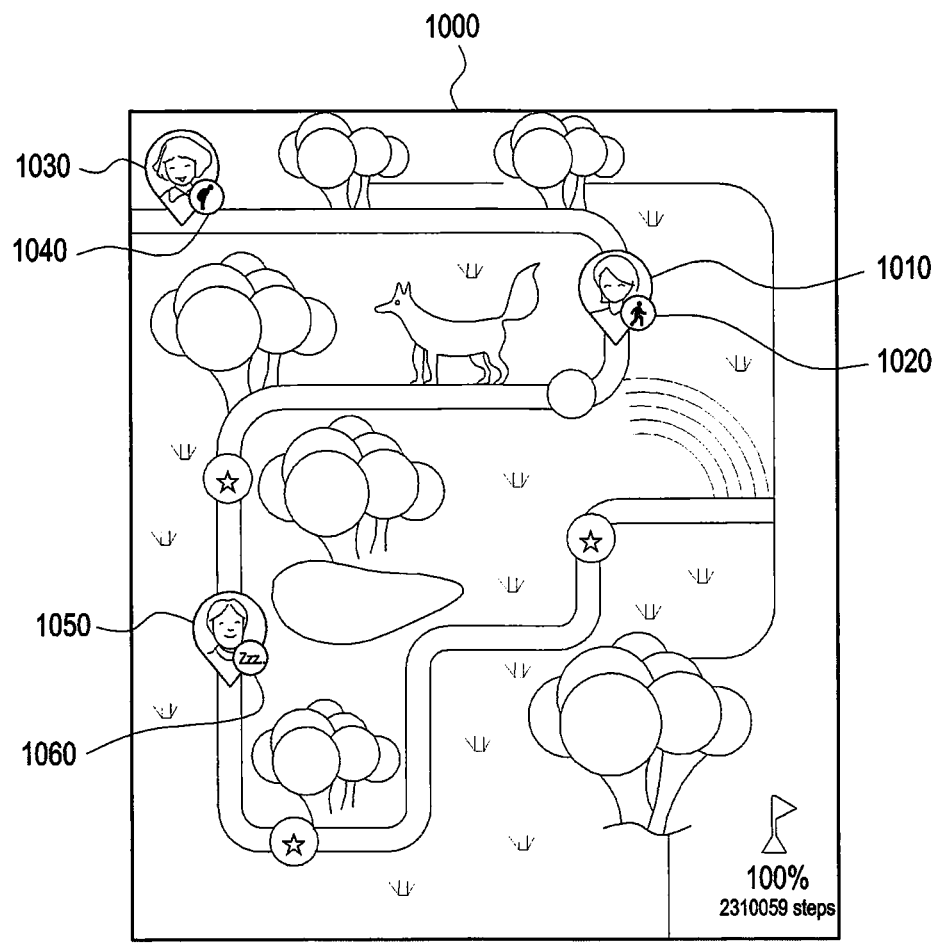
FIG. 10 is a screen on which an electronic device displays state information for the electronic device, related to a designated kind of activity, and received state information for another electronic device according to various embodiments.

FIG. 10 is a screen on which an electronic device displays state information for the electronic device, related to a designated kind of activity, and received state information for another electronic device according to various embodiments. According to various embodiments, the electronic device 201 may display and provide, on the execution screen 1000 of its application, activity state information for each user, which has been received from other users in relation to a designated kind of activity, an example of which is shown in FIG. 10, as another example of the walking challenge application that provides the screen of FIG. 5.

According to various embodiments, the electronic device 201 (or the processor 210) may display a user icon 1010 for the user of the electronic device 201 and other user icons 1030 and 1050 on a screen 1000 which graphically represents the walking challenge. In a case where the user of the electronic device 201 executes the walking challenge application, the displayed screen 1000 may include information received in real-time for the state information related to the designated kind of activity of the user of the electronic device and other users in response to execution of the walking challenge application.

The activity state of the user of the electronic device 201 may be determined based on the data which is obtained by the electronic device 201 and is performed by the user of the electronic device 201 in relation to the designated kind of activity, and the activity state of the users of the external electronic devices may be determined based on the data which is performed by the users of the external electronic devices in relation to the designated kind of activity. According to various embodiments, the activity state may represent the current data value at the time of receiving the request for the activity state. For example, in a case where the user is walking at the time of receiving the request for the activity state, the activity state may contain information indicating being active. Or, the activity state may be determined as the latest value or recent several samples of heart rate (HR), blood pressure (BP), or blood glucose (BG). The activity state may also be determined as, e.g., an average to indicate the trend of the latest value. Or, in a case where data continuously occurs as HR, BP, BG or other stream data, which is continuously measured, or step data, the value accrued during a predetermined time may play a critical role, and thus, the activity state may be determined based on the weighted average in which case the weighted average may be provided or a particular state interval is distinctly obtained based on the average and information for the state interval may be transmitted as the activity state. An example method of obtaining the weighted average is as follows.

In a case where a predetermined interval is defined as a cell, the sum of data generated during an ith interval is defined as $S_i$, and the weight for the ith interval is defined as $W_i$, the weighted average $A_t$ for current time t may be calculated based on Table 1 and Equation 1 below.

TABLE 1

| steps | $S_{t-5}$ | $S_{t-4}$ | $S_{t-3}$ | $S_{t-2}$ | $S_{t-1}$ | $S_t$ |
|---|---|---|---|---|---|---|
| weight | $W_{t-5}$ | $W_{t-4}$ | $W_{t-3}$ | $W_{t-2}$ | $W_{t-1}$ | $W_t$ |

$$A_t = \sum_{k=0}^{5} s_{t-k} W_{t-k} \quad \text{[Equation 1]}$$

The state information may be simplified based on the weighted average and be third data. For example, the weighted average may be divided into three steps: slow; normal; and boosted, and $L_1$ and $L_2$ may be set as reference values for identifying the interval. For example, a predetermined interval may be set to 10 minutes, the sum of the step data generated for 10 minutes may be calculated, and the current weighted average may be calculated using six intervals which constitute the latest 60 minutes. In a case where $L_1$ is set to 100, and $L_2$ is set to 500 based on the calculated weighted average, an example calculated based on the user's data pattern is as shown in Table 2 below.

TABLE 2

| steps/10 mins | Weighted Avg. | Status |
|---|---|---|
| 240 | 177 | 1 |
| 372 | 280 | 1 |
| 0 | 136 | 0 |
| 57 | 95 | 0 |
| 192 | 156 | 1 |
| 43 | 100 | 0 |
| 0 | 47 | 0 |
| 692 | 368 | 1 |
| 461 | 417 | 1 |
| 1053 | 709 | 2 |
| 1080 | 901 | 2 |
| 485 | 668 | 2 |
| 0 | 347 | 1 |
| 0 | 194 | 1 |
| 3 | 131 | 0 |
| 66 | 99 | 0 |
| 35 | 54 | 0 |
| 12 | 21 | 0 |
| 24 | 24 | 0 |
| 117 | 71 | 0 |
| 0 | 36 | 0 |
| 0 | 14 | 0 |
| 0 | 11 | 0 |
| 0 | 6 | 0 |
| 0 | 5 | 0 |
| 0 | 0 | 0 |

The user who has received the request for the second data may include the state value calculated as in Table 2 in the push message and reply therewith. Or, the weighted average may be transmitted, or the value recently measured or arithmetic mean may be calculated and transmitted.

According to various embodiments, upon receiving the weighted average, the electronic device 201 displaying the second data may calculate the status as in Table 2 and display the status or may display a specific value as is. What is represented by abstracting the received second data may be an icon designated according to a designated kind of type information and may be displayed as a running state 1020 of the user icon 1010 of FIG. 10, a ready state 1040 of the user icon 1030, or a sleeping state of the user icon 1050. The particular state of the second data may be omitted without being displayed.

Figure 11:
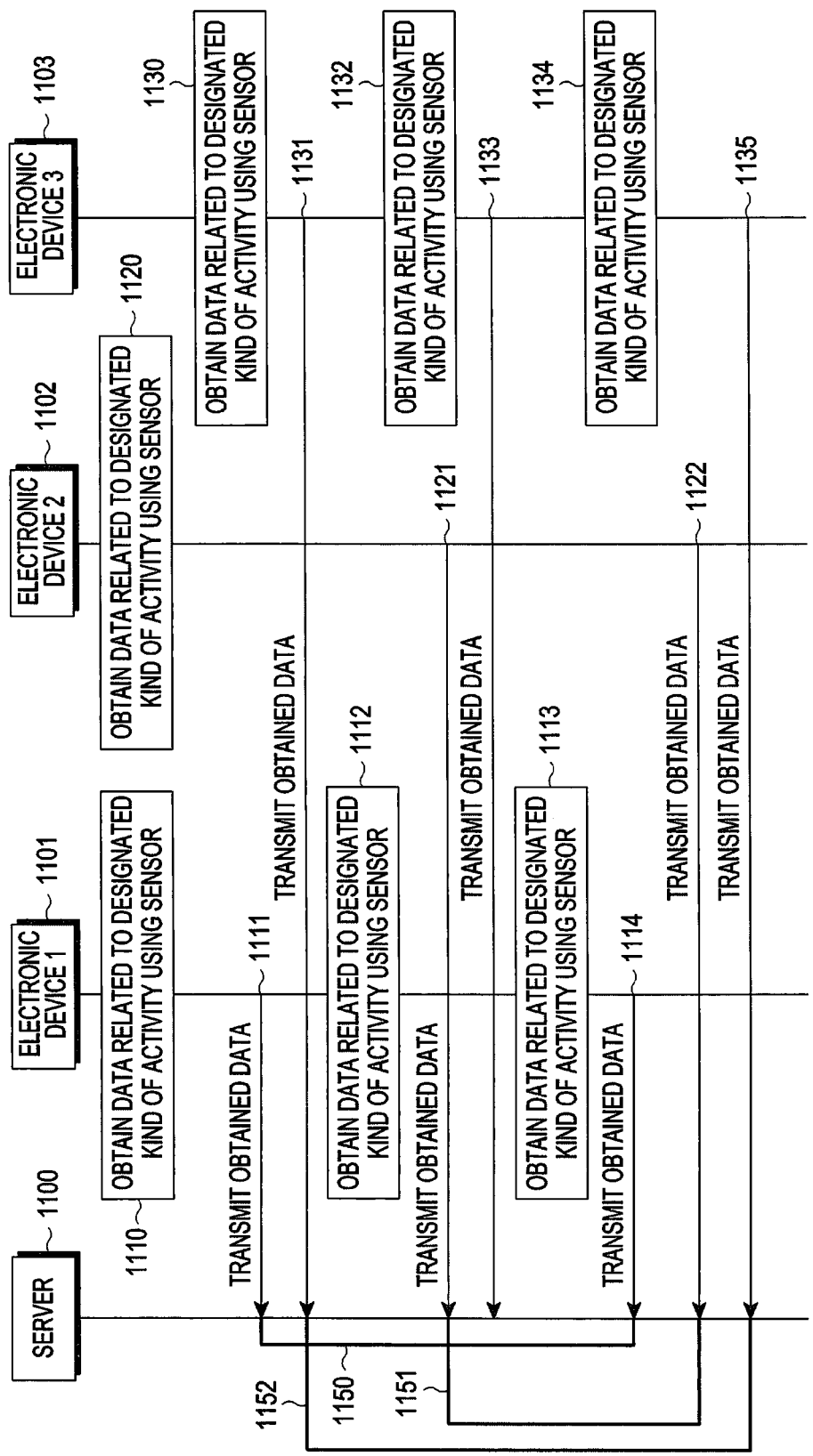
FIG. 11 is a sequence diagram illustrating a scenario in which electronic devices transmit data related to a designated kind of activity to a server according to various embodiments.

FIG. 11 is a sequence diagram illustrating a scenario in which electronic devices transmit data related to a designated kind of activity to a server according to various embodiments. According to various embodiments, the electronic devices 1101, 1102, and 1103 may obtain the third data related to the result of activity that the users of the electronic devices 1101, 1102, and 1103 have done in relation to the designated kind of activity, using the sensors included in the electronic devices and transmit the third data to the server through at least one communication module according to a predetermined period. Or, the third data may be data received by a user input, and the third data received by the user input may be third data to the server at the time of the user input. As an example, in a case where the designated kind of activity is calorie intake activity and calorie consumption activity regarding a weight loss application, the user may input the kind and amount of food eaten via the user interface, which is provided by the application through the touchscreen, in relation to the calorie intake activity, and the activity result data (e.g., third data) related to the input calorie intake activity may be third data to the server corresponding to the user input. Or, the user's running activity in relation to the calorie consumption activity may be obtained using a gyro sensor and acceleration sensor, and the activity result data (e.g., third data) related to the obtained calorie consumption may be third data to the server according to a predetermined period.

Electronic device 1 1101 may upload the third data onto the server 1100 according to a predetermined period 1150. Electronic device 1 1101 may obtain the data related to the designated kind of activity using the sensor (operation 1110) and, when a predetermined time arrives, transmit the obtained data to the server 1100 (operation 1111). Electronic device 1 1101 may obtain the data related to the designated kind of activity using the sensor in operation 1112 and, also in operation 1113, obtain the data related to the designated kind of activity using the sensor. If a predetermined period arrives, electronic device 1 1101 may transmit the data obtained in operations 1112 and 1113 to the server 1100 (operation 1114).

Electronic device 2 1102 may upload the third data onto the server 1100 according to a predetermined period 1151. Electronic device 2 1102 may obtain the data related to the designated kind of activity using the sensor (operation 1120) and, when a predetermined time arrives, transmit the obtained data to the server 1100 (operation 1121). If the predetermined 1151 arrives back, with no more third data obtained after the third data is obtained in operation 1120, electronic device 2 1102 may again upload the data obtained in operation 1120 to the server 1100 (operation 1122) and terminate the procedure without repeatedly transmitting the same third data to the server 1100. Unlike in operation 1122, if electronic device 2 1102 does not transmit the third data to the server 1100, it may be known that electronic device 2

1102 has not received data related to the designated kind of activity since electronic device 2 1102 fails to receive new third data although the predetermined period 1151 has arrived back. Although the time when the operation 1110 of obtaining the data related to the designated kind of activity using the sensor by electronic device 1 1101 occurs is similar to the time when the operation 1120 of obtaining the data related to the designated kind of activity using the sensor by electronic device 2 1102 occurs, since data is uploaded onto the server 1100 according to a predetermined period for each electronic device, the server 1100 may receive the third data of electronic device 1 1101 (operation 1111) first and the third data of electronic device 2 1102 later (operation 1121).

Electronic device 3 1103 may obtain the data related to the designated kind of activity using the sensor (operation 1130) and, when the predetermined period 1152 arrives, upload the data obtained in operation 1130 onto the server 1100 (operation 1131). By the user input, the data related to the designated kind of activity may be obtained (operation 1132) and, if the third data is obtained by the user input, it may be uploaded onto the server 1100 immediately regardless of the predetermined period 1152 (operation 1132). The third data may be received by the user input while the user is running the application related to the designated kind of activity, which may mean that the third data is uploaded when received. Further, the data related to the designated kind of activity may be obtained using the sensor (operation 1134) and, when the predetermined period 1152 of electronic device 3 1103 arrives back, the obtained data may be transmitted to the server 1100 (operation 1135).

Figure 12:
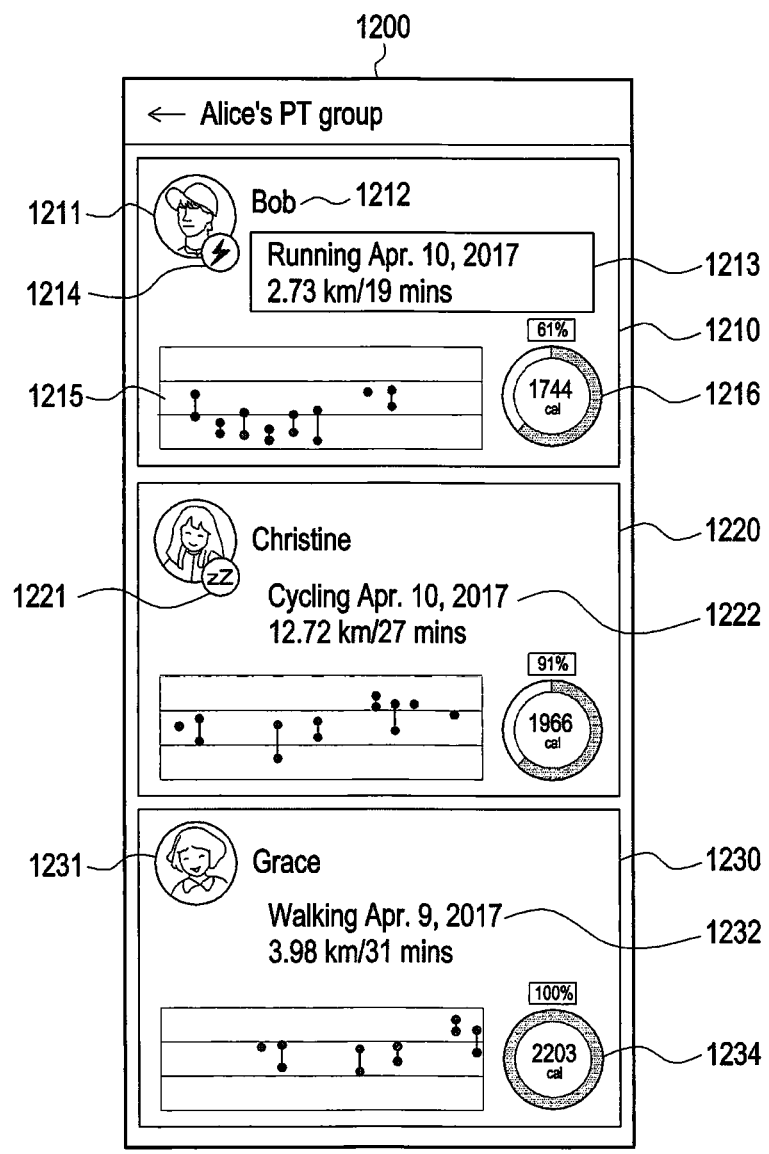
FIG. 12 is a screen on which an electronic device displays activity state data and activity result data related to a designated kind of activity according to various embodiments.

FIG. 12 is a screen on which an electronic device displays activity state data and activity result data related to a designated kind of activity according to various embodiments. According to various embodiments, the electronic device 201 may display, on the execution screen 1200 of the application related to the designated kind of activity as shown in FIG. 12, the first data obtained by the external electronic device corresponding to one or more users and received from the server and the second data received from the external electronic device, along with the data related to the designated kind of activity for the user of the electronic device 201 (e.g., the third data related to the activity result and the fourth data related to the activity state). FIG. 12 illustrates an example application which provides group personal training (PT) which one or more users participate in.

According to various embodiments, the electronic device 201 (or the processor 210), the user of the electronic device 201 may display activity result data and activity state data for calorie consumption activity related to the group PT, and one or more users may display the activity result data and activity state data for the calorie consumption activity related to the group PT. For example, the user of the electronic device 201, Bob, is participating in the group PT the user Alice manages, and the users Christine and Grace are also participating in. If the user Bob executes a group PT application on the electronic device 201, the electronic device 201 may provide a group PT status screen 1200.

In the screen 1200, the group PT-related activity data of Bob who is the user of the electronic device 201 may be displayed in area 1210, and the group PT-related activity data of the other users Christine and Grace may be displayed in area 1220 and area 1230. Each user may be identified by a user icon 1211, 1221, or 1231 and name, and each user's real-time activity state information may be represented as a sub activity state icon 1214 or 1221 displayed along with the user icon. The activity result data may be summarized by time and activity content and be provided as text as indicated with 1213, 1222, and 1232, and the data accrued over time may be graphically represented and displayed as indicated with 1215. Further, in relation to whether a set goal has been achieved, a set target calorie consumption and the current position according to the goal achievement may be represented as a value and percent data as indicated with 1216. Specifically, as the date related to the result of activity that the user Bob has done before in relation to group PT, the activity result of running 2.73 km for 19 minutes on Apr. 10, 2017 may be displayed as indicated with 1213 and be displayed based on data obtained corresponding to execution of the application. For another user Christine, the information uploaded onto the server may be received by the electronic device 201 and may be displayed as the activity result of cycling 12.72 km for 27 minutes on Apr. 10, 2017. Another user Grace may display the activity of walking 3.98 km for 31 minutes on Apr. 9, 2017 and may be data received from the server.

According to various embodiments, the electronic device 201 may receive activity result data of the other users and display the data in areas 1222 and 1232 based on the latest data.

According to various embodiments, the electronic device 201 may receive the current activity states of the other users from the external electronic devices corresponding to the other users and display the same as icon 1221. As an example, in response to a request for current state information from the user of the electronic device 201, Bob, the state in which the user Christine is currently inactive in relation to the group PT may be received, and an icon 1221 indication a sleeping state may be displayed. In another embodiment, in response to the request for current state information from the user Bob, a predetermined icon 1221 may be displayed for the case where no active state information is received from the user Christine. For another user Grace, whether the goal is achieved may be displayed as indicated with 1234 as the state in which the set goal has been achieved and, since the set goal has been achieved, no request for current state information is made or, although requested, the current state information may not be received. In a case where the current state information is not received for the user Grace, displaying an icon indicating activity state information may be omitted unlike for the user Christine.

Figure 13:
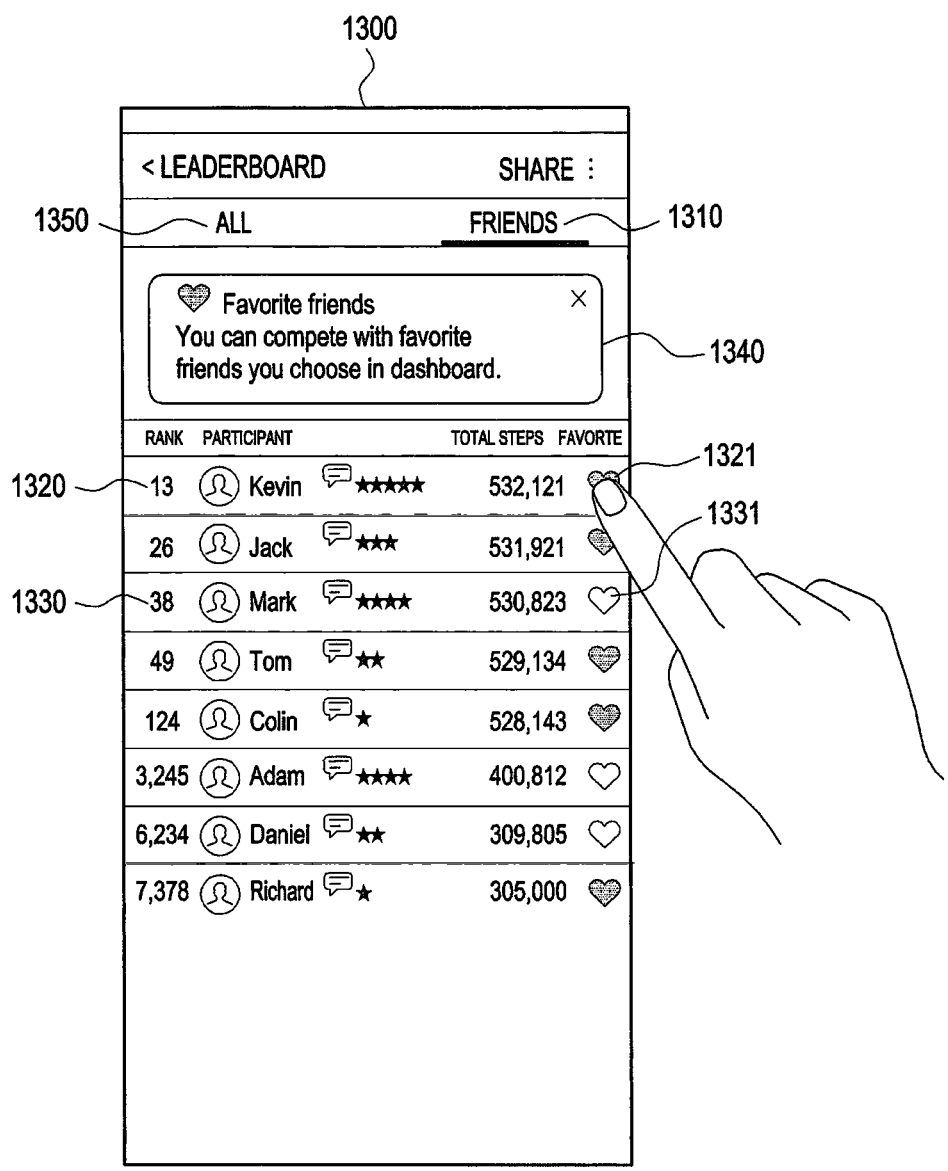
FIG. 13 is a view illustrating an example screen for an electronic device to select a friend of interest by a user input according to various embodiments.

FIG. 13 is a view illustrating an example screen for an electronic device to select a friend of interest by a user input according to various embodiments. According to various embodiments, the electronic device 201 (or the processor 210) may provide activity information for other users, who correspond to friends, acquaintances, or family members with whom the user of the electronic device 201 has a social relationship, among people participating in an application providing a designated kind of activity. The user of the electronic device 201 may select and determine one or more users who desire to receive activity information using a user interface as shown in FIG. 13.

According to various embodiments, the processor 210 may receive information for a plurality of users participating in the designated kind of activity through at least one communication module 220 and may receive second data for one or more users who are included both in a plurality of users stored in the electronic device 201 and the plurality of users whose information has been received. Further, the processor 210 may receive the second data only for people selected corresponding to a user input for the user of the electronic device 201 to add a friend among the one or more users.

According to various embodiments, the electronic device 201 may provide an add-friend screen 1300 that allows the user of the electronic device 201 to select a friend of interest on a particular application. The add-friend screen 1300 may provide the one or more users, who are included in the plurality of users stored in the electronic device 201 among all of the users in the ALL list 1350 of all users participating in the particular application, in the FRIENDS list 1310. By providing the screen 1340 for describing how to add a friend, the processor 210 may determine a friend of interest, corresponding to the user of the electronic device 201 selecting a heart icon indicating a friend of interest FAVORITE on the FRIENDS list.

In FIG. 13, to select Kevin 1320 as the friend of interest FAVORITE, the user of the electronic device 201 may touch Kevin's FAVORITE icon 1321. The user selected as a friend of interest by the user may be displayed in Kevin's FAVORITE icon 1321, and the user not selected as a friend of interest by the user may be displayed in Mark 1330's FAVORITE icon 1331. In FIG. 13, the users selected as friends of interest are Kevin, Jack, Tom, Colin, and Richard, and the users not selected as friends of interest by the user are Mark, Adam, and Daniel. Thus, the processor 210 may display activity information data for, e.g., Kevin registered as a friend of interest, but not for activity information data for, e.g., Mark, not registered as a friend of interest, on the execution screen of the particular application of the user of the electronic device 201.

Figure 14:
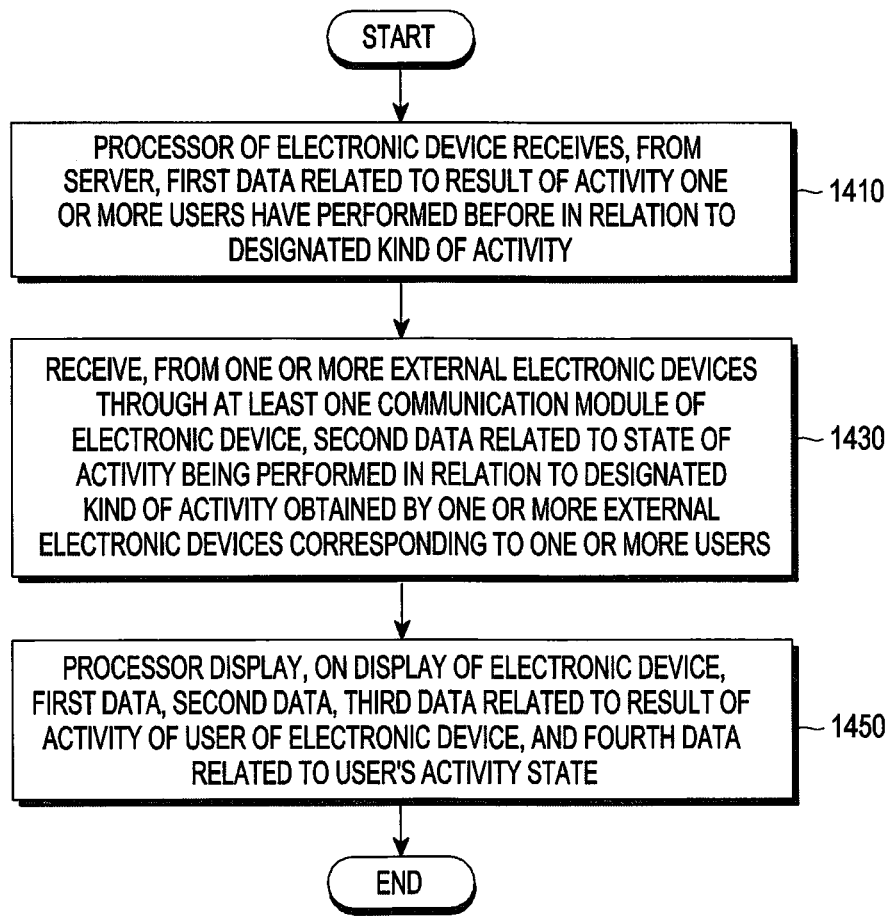
FIG. 14 is a flowchart illustrating a method of displaying data related to a designated kind of activity by an electronic device according to various embodiments.

FIG. 14 is a flowchart illustrating a method of displaying data related to a designated kind of activity by an electronic device according to various embodiments.

In operation 1410, according to various embodiments, the electronic device 201 (or the processor 210) may receive, from a server, first data related to a result of an activity which one or more users have performed before in relation to a designated kind of activity, using the at least one communication module. The first data stored in the server may refer to data which is the result of uploading activity result data obtained in relation to the designated kind of activity by the external electronic devices corresponding to the one or more users to the server according to a predetermined period. The one or more users may mean one or more users who have a social relation with the user of the electronic device 201 among the plurality of users participating in the designated kind of activity. As an example, users who are included both in the plurality of users participating in the designated kind of activity and stored in the server and in the plurality of users stored in the electronic device 201 may be determined as the one or more users. In other words, in a case where friends of the user of the electronic device 201 are included, as friend information, in the electronic device 201, participate in the designated kind of activity, and are registered as user information in the server, the friends may be included in the one or more users.

In operation 1430, the processor 210 may receive, from one or more external electronic devices corresponding to the one or more users, second data related to a state of an activity being performed in relation to the designated kind of activity obtained by the one or more external electronic devices, using the at least one communication module of the electronic device 201. The processor 210 may transmit request data containing identification information for the one or more users for requesting the second data and activity state type information to another server and receive the second data via the other server. The other server may mean a server other than the first server storing the first data and transmitting it to the electronic device 201.

In operation 1450, the processor 210 may display the first data received from the server in operation 1410, the second data received from the external electronic devices in operation 1430, third data related to the result of activity of the user of the electronic device 201, and fourth data related to the user's activity state on the display 260 included in the electronic device 201. The first data may denote data which used to be stored in the server and has been uploaded to the server by the external electronic devices corresponding to the one or more users according to their respective predetermined periods. The second data may denote data which has been received from the external electronic devices in response to a request for displaying the second data via the other server. Based on the time of displaying the first data and the second data, the second data may be real-time data received in response to the request for the second data.

Figure 15:
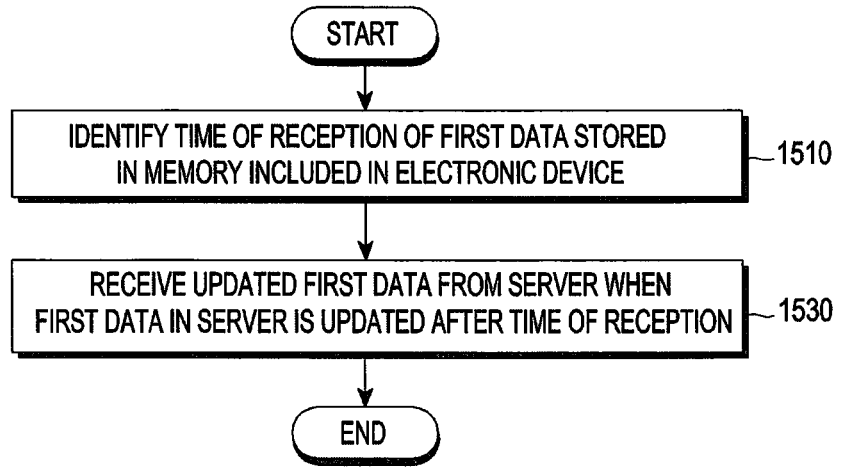
FIG. 15 is a flowchart illustrating a method of receiving data related to another user's designated kind of activity by an electronic device through a server according to various embodiments.

FIG. 15 is a flowchart illustrating a method of receiving data related to another user's designated kind of activity by an electronic device through a server according to various embodiments. The operations of FIG. 15 may be performed as at least part of operation 1410 of FIG. 14.

In operation 1510, according to various embodiments, the electronic device 201 (or the processor 210) may identify the time of reception of the first data stored in the memory 230 of the electronic device 201. The first data may be activity result data related to the designated kind of activity, which has been transmitted from the external electronic devices corresponding to the one or more users to the server and be stream data which is obtained from data sensed by the sensors included in the external electronic device and accrued over time. In the first data, the activity result value may be varied depending on the time of upload to the server. As an example, the first data uploaded to the server by the first external electronic device at 9 AM of the day and the first data uploaded to the server by the first external electronic device at 6 PM of the same day may contain substantially different contents.

In operation 1530, in response to the first data being updated in the server after the time of reception, the processor 210 may receive the updated first data from the server. The first data is data uploaded and stored in the server by each external electronic device according to a predetermined period. If there is no update after the time of reception identified in operation 1510, the first data stored in the server is the same as the first data stored in the memory 230 and, thus, the first data need not be received repeatedly.

Figure 16:
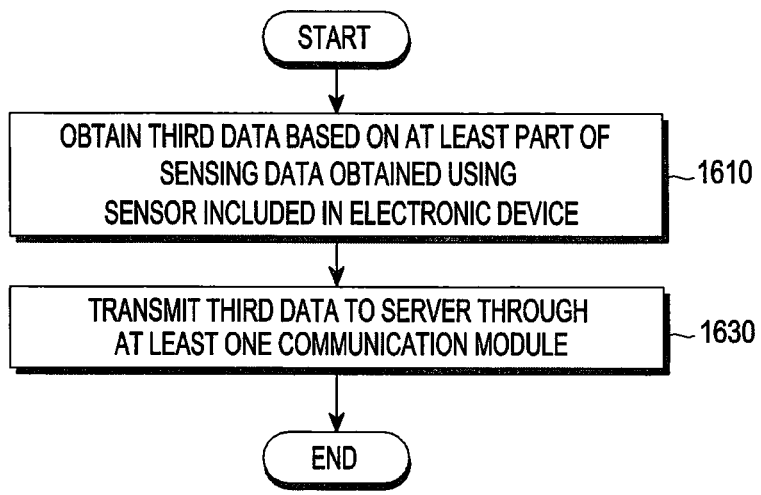
FIG. 16 is a flowchart illustrating a method of transmitting data related to a designated kind of activity to a server by an electronic device according to various embodiments.

FIG. 16 is a flowchart illustrating a method of transmitting data related to a designated kind of activity to a server by an electronic device according to various embodiments.

In operation 1610, according to various embodiments, the electronic device 201 (or the processor 210) may obtain the third data based on at least part of sensing data obtained using the sensor included in the electronic device 201. The server may be a database server for the user of the electronic device 201 to store and manage activity result data related to the designated kind of activity.

In operation 1630, the processor 210 may transmit the third data to the server using the at least one communication module 270. The processor 210 may perform the transmission of the third data according to a predetermined period. The third data may be stream data accrued over time. Transmission of the activity result data to the server only according to the predetermined period may prevent battery and data consumption of the electronic device 201 and a rise in the server operation cost which may arise as the data continuously uploads to the server.

Figure 17:
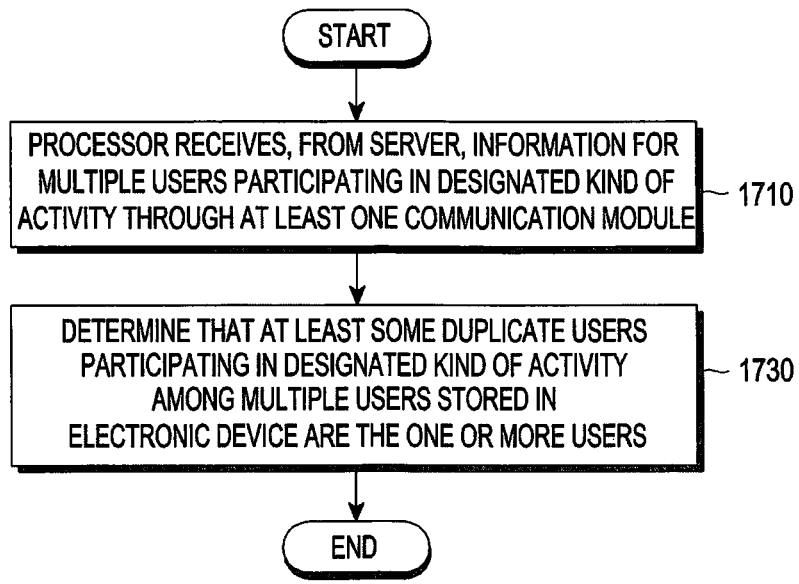
FIG. 17 is a flowchart illustrating a method of determining one or more users who desire to receive data related to a designated kind of activity by an electronic device according to various embodiments.

FIG. 17 is a flowchart illustrating a method of determining one or more users who desire to receive data related to a designated kind of activity by an electronic device according to various embodiments.

In operation 1710, according to various embodiments, the electronic device 201 (or the processor 210) may receive, from the server, information for a plurality of users participating in the designated kind of activity through at least one communication module 220. The server may receive data the users have performed in relation to the designated kind of activity from the electronic devices corresponding to the plurality of users participating in the designated kind of activity and may store identification information for the plurality of users and data information related to the designated kind of activity.

In operation 1730, the processor 210 may determine that at least some duplicate ones of the plurality of users participating in the designated kind of activity among a plurality of users stored in the electronic device are the one or more users. The one or more users may mean the entities that upload the data related to the designated kind of activity in the electronic device 201 to the server or transmit the state information related to the designated kind of activity at the request of the electronic device 201.

Figure 18:
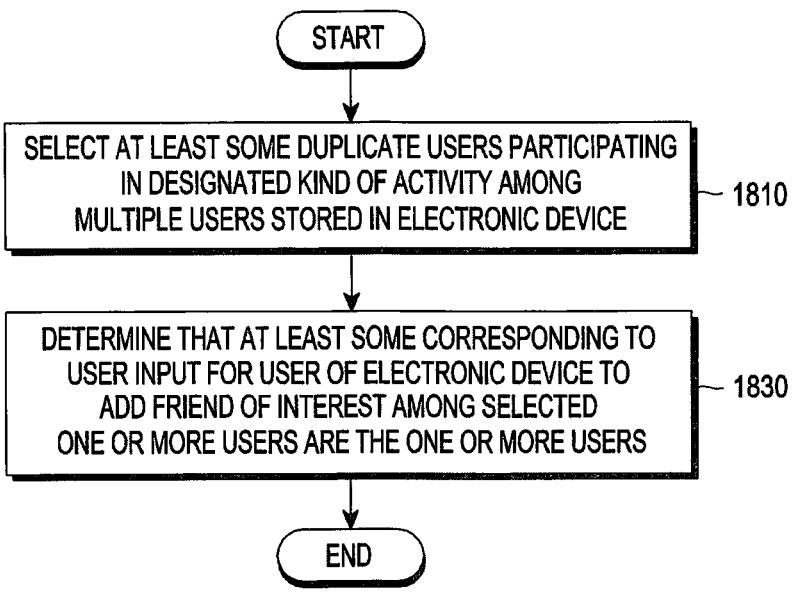
FIG. 18 is a flowchart illustrating a method of determining, by a user selection, one or more users who desire to receive data related to a designated kind of activity by an electronic device according to various embodiments.

FIG. 18 is a flowchart illustrating a method of determining, by a user selection, one or more users who desire to receive data related to a designated kind of activity by an electronic device according to various embodiments.

In operation 1810, according to various embodiments, the electronic device 201 (or the processor 210) may select at least some duplicate ones of the plurality of users participating in the designated kind of activity among a plurality of users stored in the electronic device. The plurality of users stored in the electronic device 201 may correspond to a list of friends stored based on the social relation of the user of the electronic device 201. The plurality of users participating in the designated kind of activity may be received from the server and may denote the one or more users determined in FIG. 17.

In operation 1830, the processor 210 may determine that at least some selected from among the one or more users, corresponding to a user input for the user of the electronic device 201 to add a friend of interest are the one or more users. For example, this may mean that Kevin is added as a friend of interest by the operation for the user to select a friend of interest on the execution screen of the application related to the designated kind of activity as shown in FIG. 13.

Figure 19:
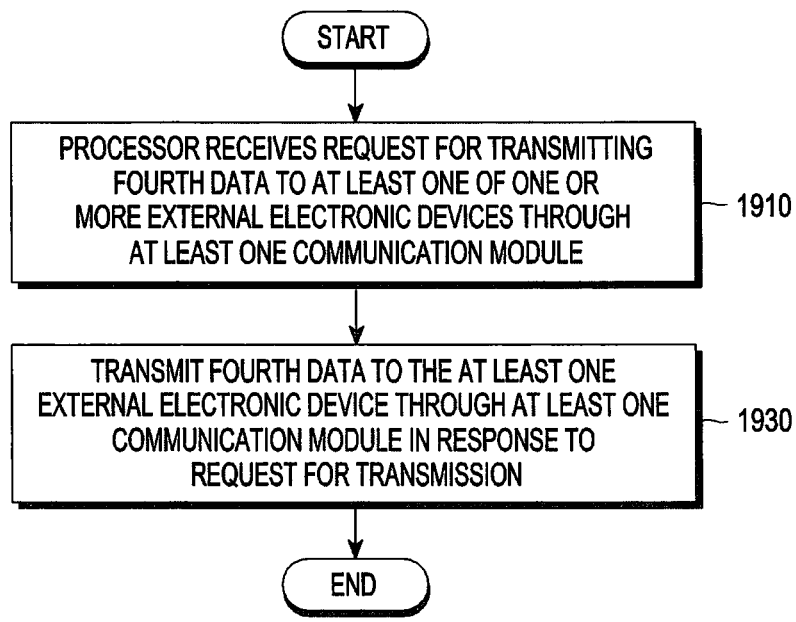
FIG. 19 is a flowchart illustrating a method of transmitting a designated kind of activity state to another electronic device by an electronic device according to various embodiments.

FIG. 19 is a flowchart illustrating a method of transmitting a designated kind of activity state to another electronic device by an electronic device according to various embodiments.

In operation 1910, according to various embodiments, the electronic device 201 (or the processor 210) may receive a request for transmission of the fourth data to at least one of the one or more external electronic devices using the at least one communication module 220. The fourth data may be state data of activity that the user of the electronic device 201 is doing in relation to the designated kind of activity.

In operation 1930, the processor 210 may transmit the fourth data to the at least one external electronic device using the at least one communication module 220 in response to the transmission request. Based on the time of reception of the transmission request, the fourth data may mean data transmitted in real-time to the external electronic device.

Figure 20:
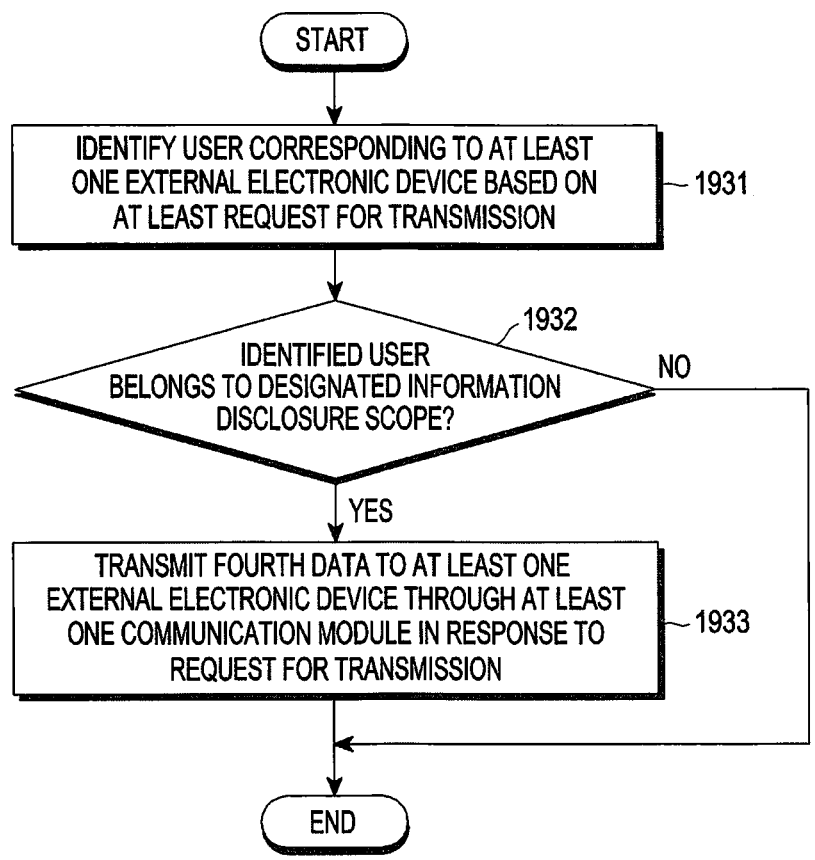
FIG. 20 is a flowchart illustrating a method of transmitting a designated kind of activity state to another electronic device according to a designated information disclosure scope, by an electronic device, according to various embodiments.

FIG. 20 is a flowchart illustrating a method of transmitting a designated kind of activity state to another electronic device according to a designated information disclosure scope, by an electronic device, according to various embodiments. The operations of FIG. 20 may be performed as at least part of operation 1930 of FIG. 19.

In operation 1931, according to various embodiments, the electronic device 201 (or the processor 210) may identify the user corresponding to the at least one external electronic device based on at least the transmission request.

In operation 1932, the processor 210 may determine whether the identified user falls within a designated information disclosure scope. The information disclosure scope may be set to disclosure to friends, full disclosure, or non-disclosure depending on the user. If the identified user does not fall within the predetermined disclosure scope, the processor 210 may terminate the operation without transmitting the activity state data (e.g., fourth data) for the user of the electronic device 201 to the other external electronic device. In contrast, if the identified user falls within the predetermined disclosure scope, the processor 210 may sense data related to the designated kind of activity of the electronic device 201, obtain the fourth data based on the sensed data, and transmit the fourth data to the at least one external electronic device (operation 1933).

According to an embodiment, there may be provided a non-transitory computer-readable recording medium storing instructions configured to perform at least one operation by a processor, the at least one operation comprising receiving, from a server, first data related to a result of an activity which one or more users have performed before in relation to a designated kind of activity, through at least one communication module, receiving, from one or more external electronic devices corresponding to the one or more users, second data related to a state of an activity being performed in relation to the designated kind of activity obtained by the one or more external electronic devices, using the at least one communication module, and displaying the first data, the second data, third data related to the result of the activity of a user of the electronic device, and fourth data related to the user's activity state, using a display.

The embodiments disclosed herein are proposed for description and understanding of the disclosed technology and does not limit the scope of the present disclosure. Accordingly, the scope of the present invention should be interpreted as including all changes or various embodiments based on the technical spirit of the present disclosure.

The invention claimed is:
1. An electronic device, comprising:
at least one communication module;
a display;
a sensor; and
a processor configured to:
receive, from a server, first data related to a result of an activity which one or more users have performed before in relation to a designated kind of activity, through the at least one communication module,
receive, from one or more external electronic devices corresponding to the one or more users, second data related to a state of an activity being performed in relation to the designated kind of activity obtained by the one or more external electronic devices, through the at least one communication module, obtain third data based on at least in part on data obtained using the sensor;

display the first data, the second data, the third data related to the result of the activity of a user of the electronic device, and fourth data related to the user's activity state, on the display, and transmit the third data to the server through the at least one communication module, wherein the third data is stream data accrued over time.

2. The electronic device of claim 1, wherein the processor is configured to transmit, to another server, request data containing identification information for the one or more users for requesting the second data and type information for the activity state, through the at least one communication module, as part of receiving the second data.

3. The electronic device of claim 1, wherein the processor is configured to display activity states of at least some of the one or more users to a designated state if failing to receive the second data.

4. The electronic device of claim 1, wherein the processor is configured to perform the transmission based on a predetermined period.

5. The electronic device of claim 1, further comprising a memory for storing the first data, wherein the processor is configured to:

as part of receiving the first data, identify a time of reception of the first data stored in the memory, and in response to the first data in the server being updated after the time of reception, receive the updated first data from the server.

6. The electronic device of claim 1, wherein the processor is configured to:

receive, from the server, information for a plurality of users participating in the designated kind of activity, through the at least one communication module, and determine that at least some duplicate ones of the plurality of users participating in the designated kind of activity among a plurality of users stored in the electronic device are the one or more users.

7. The electronic device of claim 1, wherein the processor is configured to determine that at least some selected from among the one or more users, corresponding to a user input for the user of the electronic device to add a friend of interest are the one or more users.

8. The electronic device of claim 1, wherein the processor is configured to display the second data and the fourth data using an icon designated corresponding to the designated kind of activity.

9. The electronic device of claim 1, wherein the processor is configured to:

receive a request for transmission of the fourth data to at least one of the one or more external electronic devices, through the at least one communication module, and in response to the request of transmission, transmit the fourth data to the at least one external electronic device, through the at least one communication module.

10. The electronic device of claim 9, wherein the processor is configured to receive the request for transmission to the at least one external electronic device via another server or transmit the fourth data to the at least one external electronic device, through the at least one communication module.

11. The electronic device of claim 9, wherein the processor is configured to, as at least part of transmitting to the at least one external electronic device, identify a user corresponding to the at least one external electronic device based on at least the request for transmission, and when the identified user belongs to a designated information disclosure scope, perform the transmission.

12. A method for operating an electronic device, the method comprising:

receiving, from a server, first data related to a result of an activity which one or more users have performed before in relation to a designated kind of activity, through at least one communication module;

receiving, from one or more external electronic devices corresponding to the one or more users, second data related to a state of an activity being performed in relation to the designated kind of activity obtained by the one or more external electronic devices, through the at least one communication module;

obtaining third data based on at least of sensing data obtained using a sensor; and displaying the first data, the second data, the third data related to the result of the activity of a user of the electronic device, and fourth data related to the user's activity state, on a display, wherein the third data is stream data accrued over time.

13. The method of claim 12, wherein receiving the second data includes transmitting, to another server, request data containing identification information for the one or more users for requesting the second data and type information for the activity state, through the at least one communication module.

14. The method of claim 12, further comprising displaying activity states of at least some of the one or more users to a designated state if failing to receive the second data.

15. The method of claim 12, wherein the transmitting the third data to the server is performed based on a predetermined period.

16. The method of claim 12, wherein the receiving the first data comprising:

identifying a time of reception of the first data stored in a memory, and in response to the first data in the server being updated after the time of reception, receiving the updated first data from the server.

17. The method of claim 12, further comprising:

receiving, from the server, information for a plurality of users participating in the designated kind of activity, through the at least one communication module, and determining that at least some duplicate ones of the plurality of users participating in the designated kind of activity among a plurality of users stored in the electronic device are the one or more users.

18. The method of claim 12, further comprising:

determining that at least some selected from among the one or more users, corresponding to a user input for the user of the electronic device to add a friend of interest are the one or more users.

* * * * *